(12) United States Patent
Largman et al.

(10) Patent No.: US 7,577,871 B2
(45) Date of Patent: *Aug. 18, 2009

(54) COMPUTER SYSTEM AND METHOD HAVING ISOLATABLE STORAGE FOR ENHANCED IMMUNITY TO VIRAL AND MALICIOUS CODE INFECTION

(75) Inventors: Kenneth Largman, San Francisco, CA (US); Anthony More, Sebastopol, CA (US); Jeffrey Blair, San Francisco, CA (US)

(73) Assignee: Vir2us, Inc., Sausalito, CA (US)

( * ) Notice: Subject to any disclaimer, the term of this patent is extended or adjusted under 35 U.S.C. 154(b) by 266 days.

This patent is subject to a terminal disclaimer.

(21) Appl. No.: 11/386,493

(22) Filed: Feb. 16, 2006

(65) Prior Publication Data

US 2006/0161813 A1  Jul. 20, 2006

Related U.S. Application Data

(63) Continuation of application No. 10/075,136, filed on Nov. 19, 2001, now Pat. No. 7,096,381, which is a continuation-in-part of application No. 09/862,898, filed on May 21, 2001, now Pat. No. 6,880,110.

(60) Provisional application No. 60/205,531, filed on May 19, 2000, provisional application No. 60/220,282, filed on Jul. 24, 2000.

(51) Int. Cl.
*G06F 11/00* (2006.01)

(52) U.S. Cl. .................. 714/20; 714/2; 714/13; 714/19; 714/38

(58) Field of Classification Search ............ 714/2, 714/7, 13, 19, 20, 23, 38
See application file for complete search history.

(56) References Cited

U.S. PATENT DOCUMENTS

| 4,464,747 A | 8/1984 | Groudan et al. |
|---|---|---|
| 4,939,694 A | 7/1990 | Eaton et al. |
| 5,434,562 A | 7/1995 | Reardon |
| 5,655,069 A | 8/1997 | Ogawara et al. |
| 5,704,031 A | 12/1997 | Mikami et al. |
| 5,732,268 A | 3/1998 | Bizzarri |
| 5,737,118 A | 4/1998 | Sugaya et al. |
| 5,764,878 A | 6/1998 | Kablanian et al. |
| 5,826,012 A | 10/1998 | Lettvin |

(Continued)

FOREIGN PATENT DOCUMENTS

CA   2197502 A1   8/1998

(Continued)

OTHER PUBLICATIONS

Unknown Author, "Bulletin Board," Laptop Magazine, p. 14, Jul. 2001.

(Continued)

*Primary Examiner*—Robert Beausoliel
*Assistant Examiner*—Joseph D Manoskey
(74) *Attorney, Agent, or Firm*—Perkins Coie LLP

(57) ABSTRACT

An apparatus and method of supporting the backup and recovery of a computing device. The computing device typically includes both a user computing environment and a supporting environment which enhances the stability and functionality of the user computing environment.

61 Claims, 13 Drawing Sheets

U.S. PATENT DOCUMENTS

| | | | |
|---|---|---|---|
| 5,841,712 A | 11/1998 | Wendell et al. | |
| 5,860,001 A | 1/1999 | Cromer et al. | |
| 5,894,551 A | 4/1999 | Huggins et al. | |
| 5,920,515 A | 7/1999 | Shaik et al. | |
| 5,969,632 A | 10/1999 | Diamant et al. | |
| 5,974,549 A | 10/1999 | Golan | |
| 6,009,518 A | 12/1999 | Shiakallis | |
| 6,016,553 A | 1/2000 | Schneider et al. | |
| 6,067,618 A | 5/2000 | Weber | |
| 6,088,794 A | 7/2000 | Yoon et al. | |
| 6,175,904 B1* | 1/2001 | Gunderson | 714/3 |
| 6,178,452 B1 | 1/2001 | Miyamoto | |
| 6,199,178 B1 | 3/2001 | Schneider et al. | |
| 6,202,153 B1 | 3/2001 | Diamant et al. | |
| 6,205,527 B1 | 3/2001 | Goshey et al. | |
| 6,268,789 B1 | 7/2001 | Diamant et al. | |
| 6,289,426 B1 | 9/2001 | Maffezzoni et al. | |
| 6,301,657 B1 | 10/2001 | Jones et al. | |
| 6,317,845 B1 | 11/2001 | Meyer et al. | |
| 6,327,653 B1 | 12/2001 | Lee | |
| 6,347,375 B1 | 2/2002 | Reinert et al. | |
| 6,367,042 B1 | 4/2002 | Phan et al. | |
| 6,374,366 B1 | 4/2002 | Maffezzoni | |
| 6,381,694 B1 | 4/2002 | Yen | |
| 6,421,792 B1 | 7/2002 | Cromer et al. | |
| 6,457,069 B1 | 9/2002 | Stanley | |
| 6,477,629 B1 | 11/2002 | Goshey et al. | |
| 6,535,998 B1* | 3/2003 | Cabrera et al. | 714/15 |
| 6,577,920 B1 | 6/2003 | Hypponen et al. | |
| 6,640,317 B1 | 10/2003 | Snow | |
| 6,691,230 B1 | 2/2004 | Bardon | |
| 6,697,950 B1 | 2/2004 | Ko | |
| 6,754,818 B1 | 6/2004 | Lee et al. | |
| 6,880,110 B2 | 4/2005 | Largman et al. | |
| 7,096,381 B2 | 8/2006 | Largman et al. | |
| 7,100,075 B2 | 8/2006 | Largman et al. | |
| 7,111,201 B2 | 9/2006 | Largman et al. | |
| 7,137,034 B2 | 11/2006 | Largman et al. | |
| 2002/0004908 A1 | 1/2002 | Galea | |
| 2002/0053044 A1 | 5/2002 | Gold et al. | |
| 2002/0078366 A1 | 6/2002 | Raice | |
| 2002/0087855 A1 | 7/2002 | Dykes et al. | |
| 2002/0095557 A1 | 7/2002 | Constable et al. | |
| 2002/0133747 A1* | 9/2002 | Ravid | 714/20 |
| 2002/0169998 A1 | 11/2002 | Largman et al. | |
| 2002/0174137 A1 | 11/2002 | Wolff et al. | |
| 2003/0105973 A1 | 6/2003 | Liang et al. | |
| 2004/0083369 A1 | 4/2004 | Erlingsson et al. | |
| 2004/0210796 A1 | 10/2004 | Largman et al. | |
| 2004/0236874 A1 | 11/2004 | Largman et al. | |
| 2004/0255165 A1 | 12/2004 | Szor | |
| 2004/0268361 A1 | 12/2004 | Schaefer | |
| 2005/0010670 A1 | 1/2005 | Greschler et al. | |
| 2005/0060722 A1 | 3/2005 | Rochette et al. | |
| 2005/0149726 A1 | 7/2005 | Joshi et al. | |
| 2006/0020858 A1 | 1/2006 | Schaefer | |
| 2006/0020937 A1 | 1/2006 | Schaefer | |
| 2006/0137013 A1 | 6/2006 | Lok | |
| 2006/0143514 A1 | 6/2006 | Largman et al. | |
| 2006/0272017 A1 | 11/2006 | Largman et al. | |
| 2006/0277433 A1 | 12/2006 | Largman et al. | |

FOREIGN PATENT DOCUMENTS

| | | |
|---|---|---|
| EP | 0 978 785 A1 | 2/2000 |
| WO | WO 95/22794 A1 | 8/1995 |
| WO | WO 01/11449 A1 | 2/2001 |
| WO | WO 02/021274 | 3/2002 |
| WO | WO 02/099642 | 12/2002 |
| WO | WO 03/073208 A2 | 9/2003 |
| WO | WO 03/075158 A2 | 9/2003 |
| WO | WO 03/075158 A3 | 9/2003 |
| WO | WO 03/073208 A3 | 11/2003 |
| WO | WO 03/096169 A2 | 11/2003 |
| WO | WO 03/104954 A3 | 12/2003 |
| WO | WO 2004/012416 A2 | 2/2004 |
| WO | WO 2004/012416 A3 | 2/2004 |
| WO | WO 2005/043360 A1 | 5/2005 |

OTHER PUBLICATIONS

Collection of printouts from GreenBorder website, © 2004-2006 GreenBorder Technologies, Inc., www.greenborder.com, Jan. 27, 2006, 36 pgs.

Whitepaper: iSolation Server v.2, 2005, Avinti, Inc., Lindon, UT 15 pgs.

"iSolation Server FAQ," © 2003-2006 Avinti, Inc., www.avinti.com/downloads/isolation-server-faq.html, Jan. 27, 2006, 4 pgs.

Avinti, iSolation Server v.2 Whitepaper, © 2003-2006 Avinti, Inc., www.avinti.com/downloads/isolation-server-whitepaper.html, Jan. 27, 2005, 15 pgs.

Elrad, Tzilla et al., "Developing Secure Application Through Aspect-Oriented Programming," Nov. 18, 2004, 27.1 Introduction, 27.2 The Domain of Application-Level Security, 27.3 An Experience Report, 27.4 Discussion, 27.5 Related Work, 27.6 Conclusion, Acknowledgements, References, © 2003-2006 Pearson Education, Addison-Wesley Professional, Sample Chapter begins at www.awprofessional.com/articles/article.asp?p=340869&seqNum=1, 29 pgs.

"Server and Domain Isolation Using Ipsec and Group Policy," Mar. 17, 2005, © 2006 Microsoft Corporation, www.Microsoft.com/technet/security/topics/architectureanddesign/ipsec/default.mspx, 4 pgs.

Grizzard, Julian B. et al. "Towards an Approach for Automatically Repairing Compromised Network Systems," Jun. 2004 or later, 4 pgs.

Zeichick, Alan, Isolation and Protection: Intel's LaGrande Vision for Trusted Virtualization, Nov. 22, 2005, www.devx.com/Intel/Article/30008, Jan. 27, 2006, 4 pgs.

Sapuntzakis, Constantine and Monica S. Lam, "Virtual Appliances in the Collective: A Road to Hassle-Free Computing," May 2003 or later, 6 pgs.

Chandra, Ramesh et al., "The Collective: A Cache-Based System Management Architecture," Presented at the $2^{nd}$ Symposium on Networked Systems Design and Implementation, May 2-4, 2005, Boston MA, 14 pgs.

Chow, Jim et al., "Understanding Data Lifetime via Whole System Simulation," Aug. 2003 or later, 16 pgs.

Ruwase, Olatunji and Monica S. Lam, "A Practical Dynamic Buffer Overflow Detector," Jun. 2003 or later, 11 pgs.

Garfinkel, Tal et al., "Ostia: A Delegating Architecture for Secure System Call Interposition," Aug. 2003 or later, 15 pgs.

Sapuntzakis, Constantine et al., "Virtual Appliances for Deploying and Maintaining Software," Jun. 2003 or later, 15 pgs.

Brumley, David and Dan Boneh, "Remote Timing Attacks are Practical," 2003 or later, 13 pgs.

Li Ninghui et al. "Obvious Signature-Based Envelope," PODC'03, Jul. 13-16, 2003, Boston, MA, p. 182-19, © 2003 ACM, 8 pgs.

Garfinkel, Tal et al., "Flexible OS Support and Applications for Trusted Computing," Feb. 2003 or later, 6 pgs.

Garfinkel, Tal and Mendel Rosenblum, "A Virtual Machine Introspection Based Architecture for Intrusion Detection," Dec. 2002 or later, 16 pgs.

Garfinkel, Tal, "Traps and Pitfalls: Practical Problems in System Call Interposition Based Security Tools," Nov. 2002 or later, 14 pgs.

Sapuntzakis, Constantine et al., "Optimizing the Migration of Virtual Computers," Dec. 2002 or newer, 14 pgs.

Garfinkel, Tal et al., "Terra: A Virtual Machine-Based Platform for Trusted Computing," SOSP'03, Oct. 19-22, 2003, Bolton Landing, NY, © 2003 ACM, 14 pgs.

Lam, Monica et al., "The Collective: A Virtual Appliance Computing Infrastructure," http://suif.Stanford.edu/collective/index.html, Jan. 27, 2006, 3 pgs.

Messmer, Ellen, "GreenBorder offers security 'barrier' for IE, Outlook," Mar. 23, 2005, Computerworld, © 2005 Network World, Inc., www.computerworld.com/securitytopics/security/story/ 0,10801,100579,00.html, Jan. 27, 2006, 4 pgs.

Schmidt, Brian K. et al., "The Interactive Performance of SLIM: a Stateless, Thin-Client Architecture," 17$^{th}$ ACM Symposium on Operating Systems Principles (SOSP'99), Published as *Operating Systems Review*, 34(5):3247, Dec. 1999, SOSP-17, Dec. 1999, Kiawah Island, SC © 1999 ACM, 16 pgs.

Schmidt, Brian K. et al., "Supporting Ubiquitous Computing with Stateless Consoles and Computation Caches," Aug. 2000, 140 pgs.

Microsoft Corporation Microsoft Windows 95 Resource Kit, 1995, Microsoft Press, pp. 650-651.

International Search report for PCT application PCT/US06/013343 Search Report dated Nov. 7, 2007.

* cited by examiner

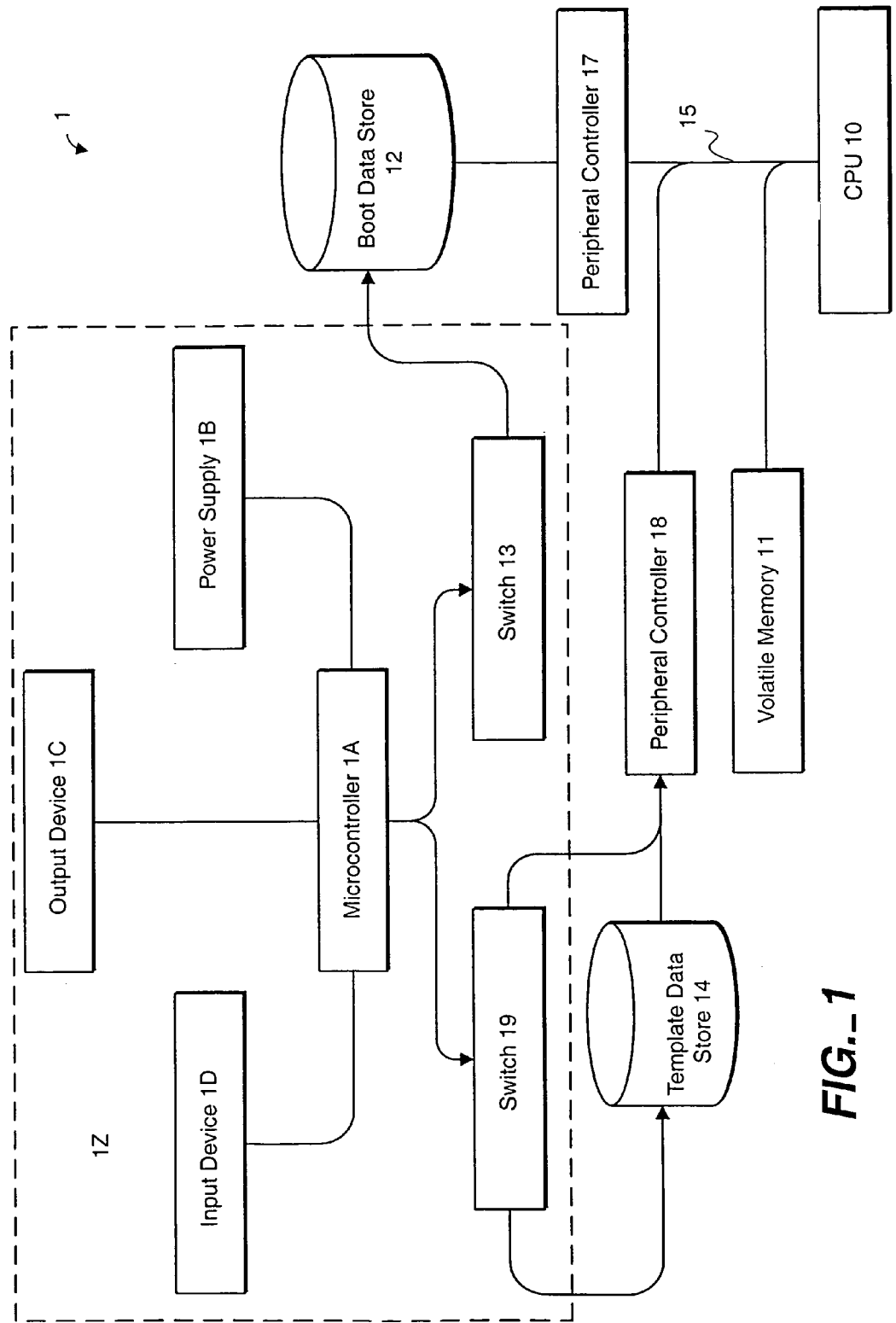
FIG._1

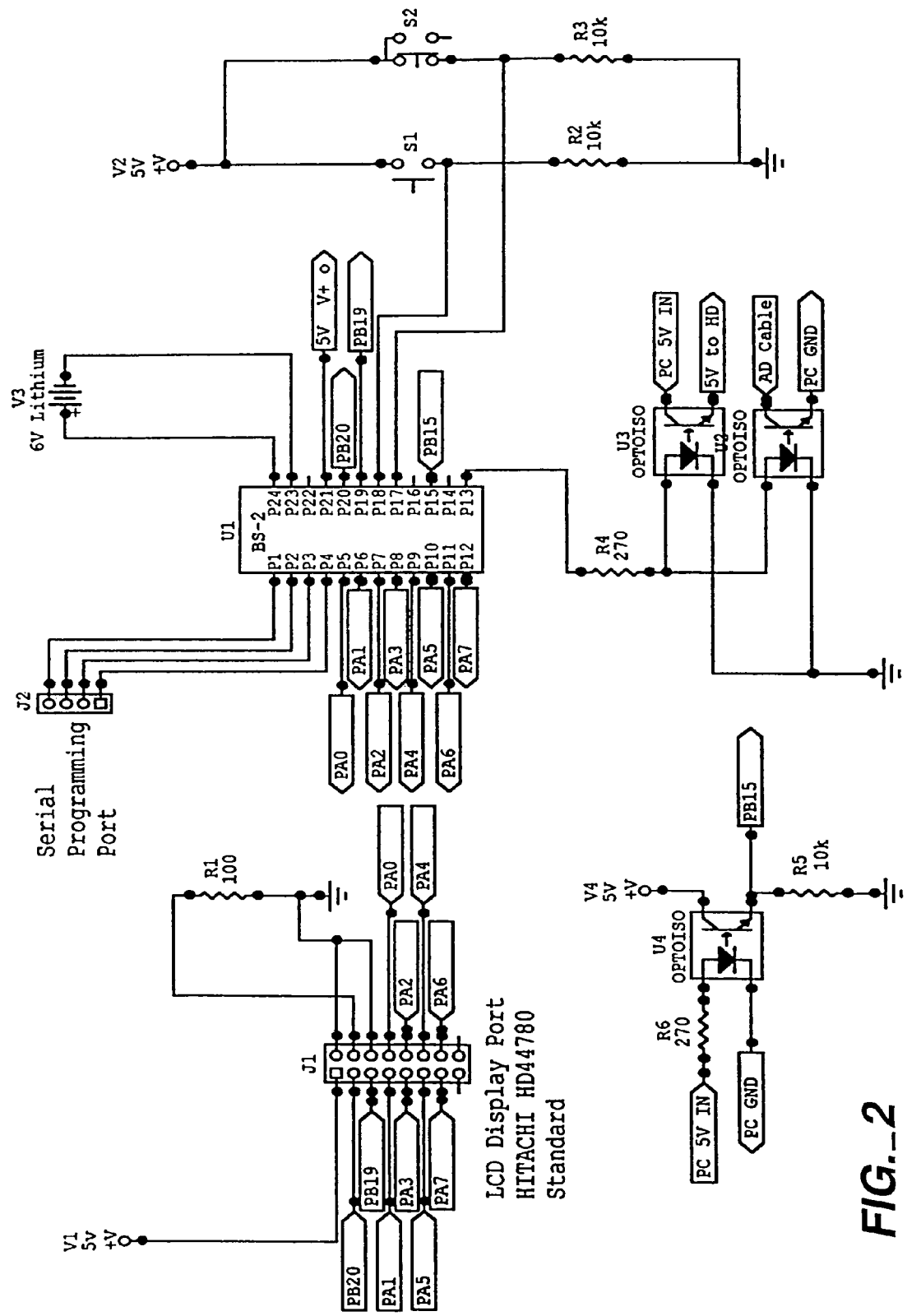
FIG._2

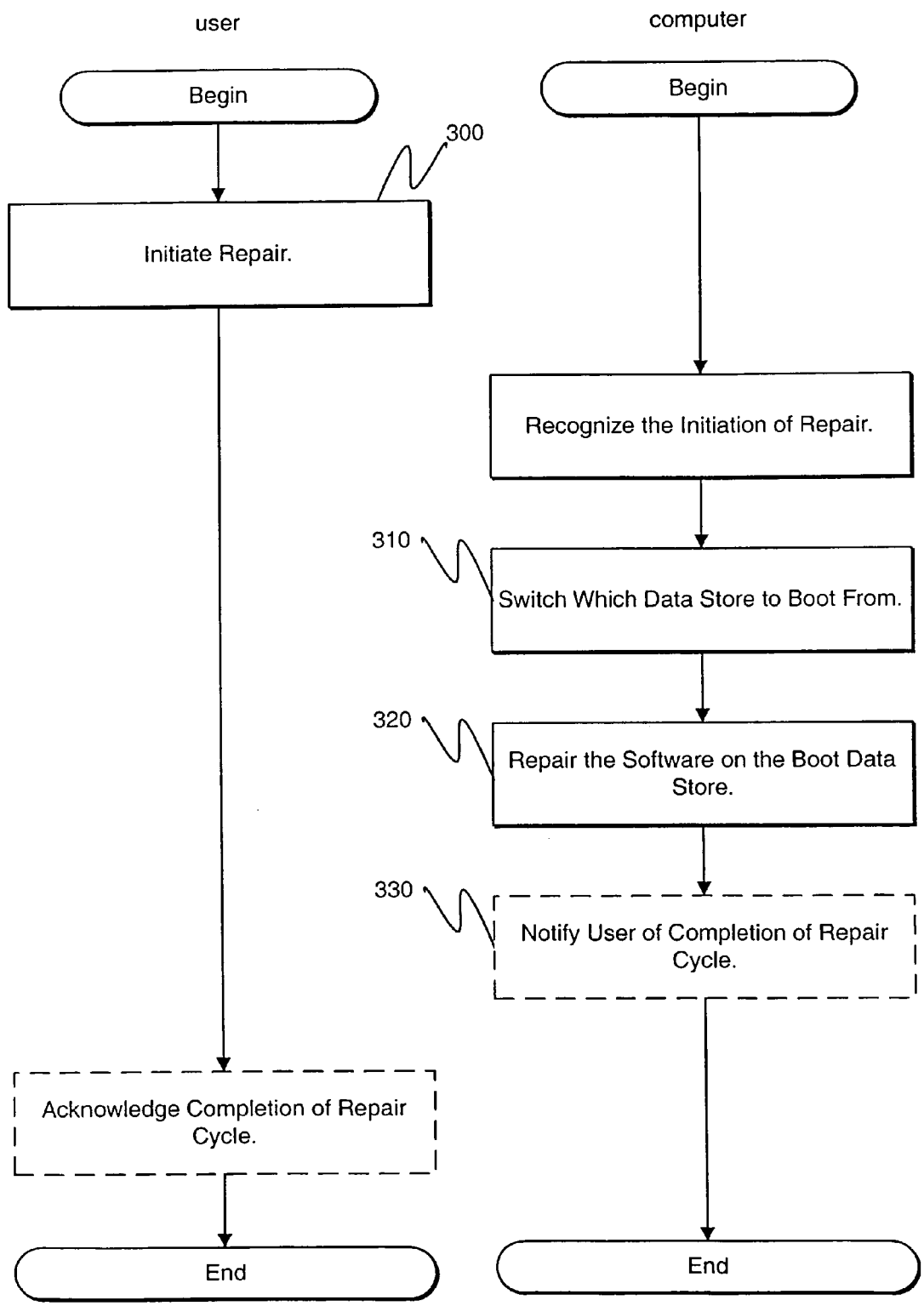
FIG._3A    FIG._3B

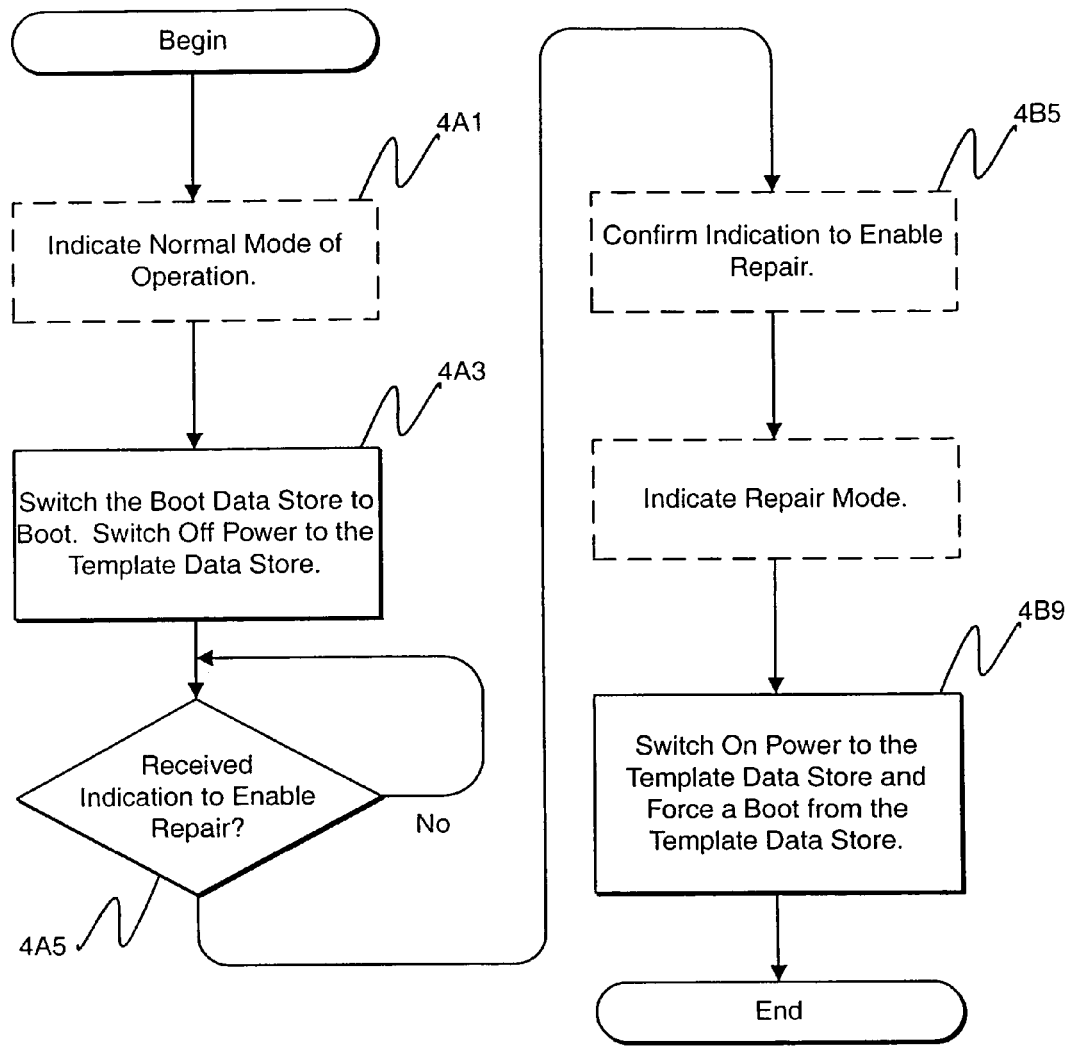
FIG._4

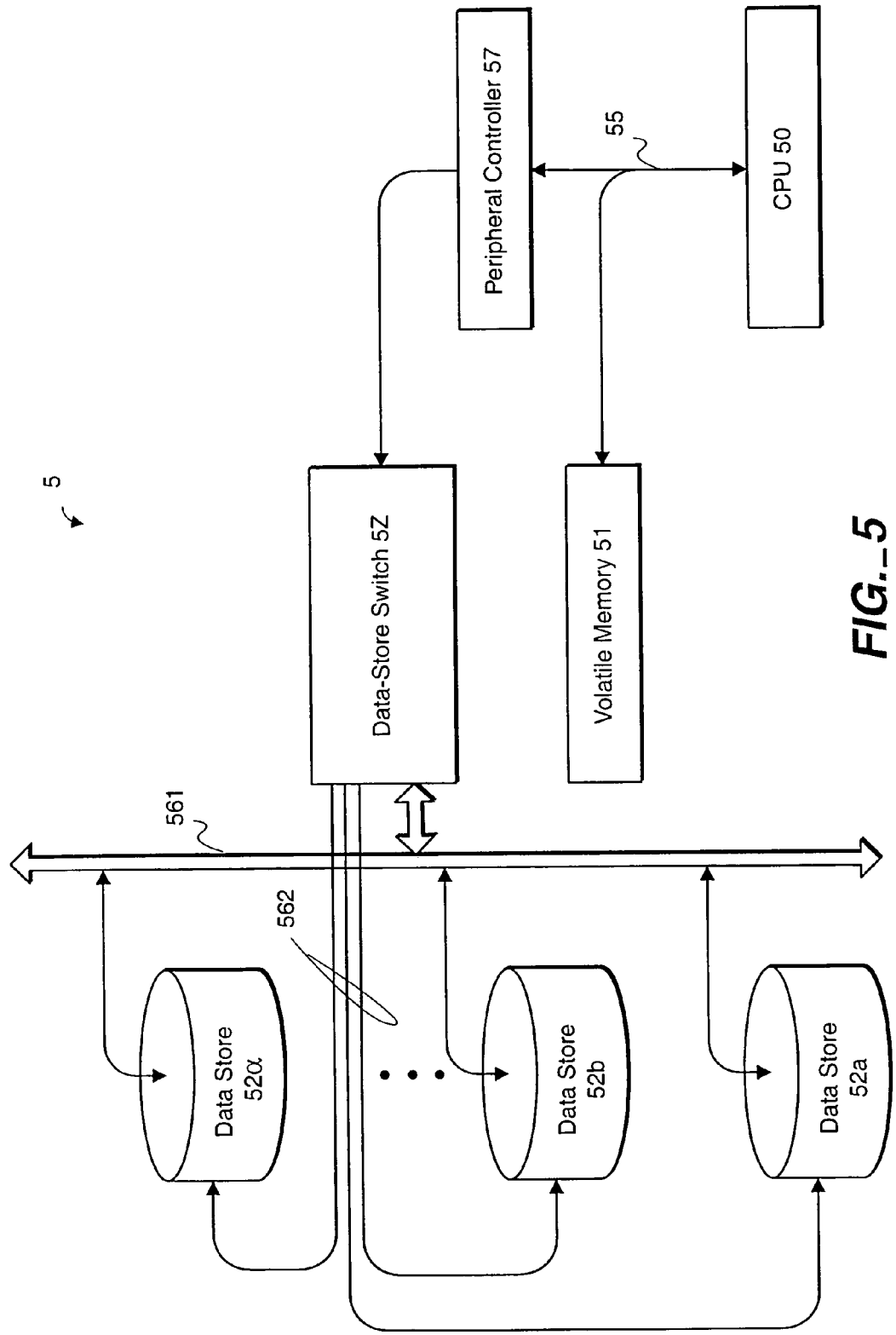
FIG._5

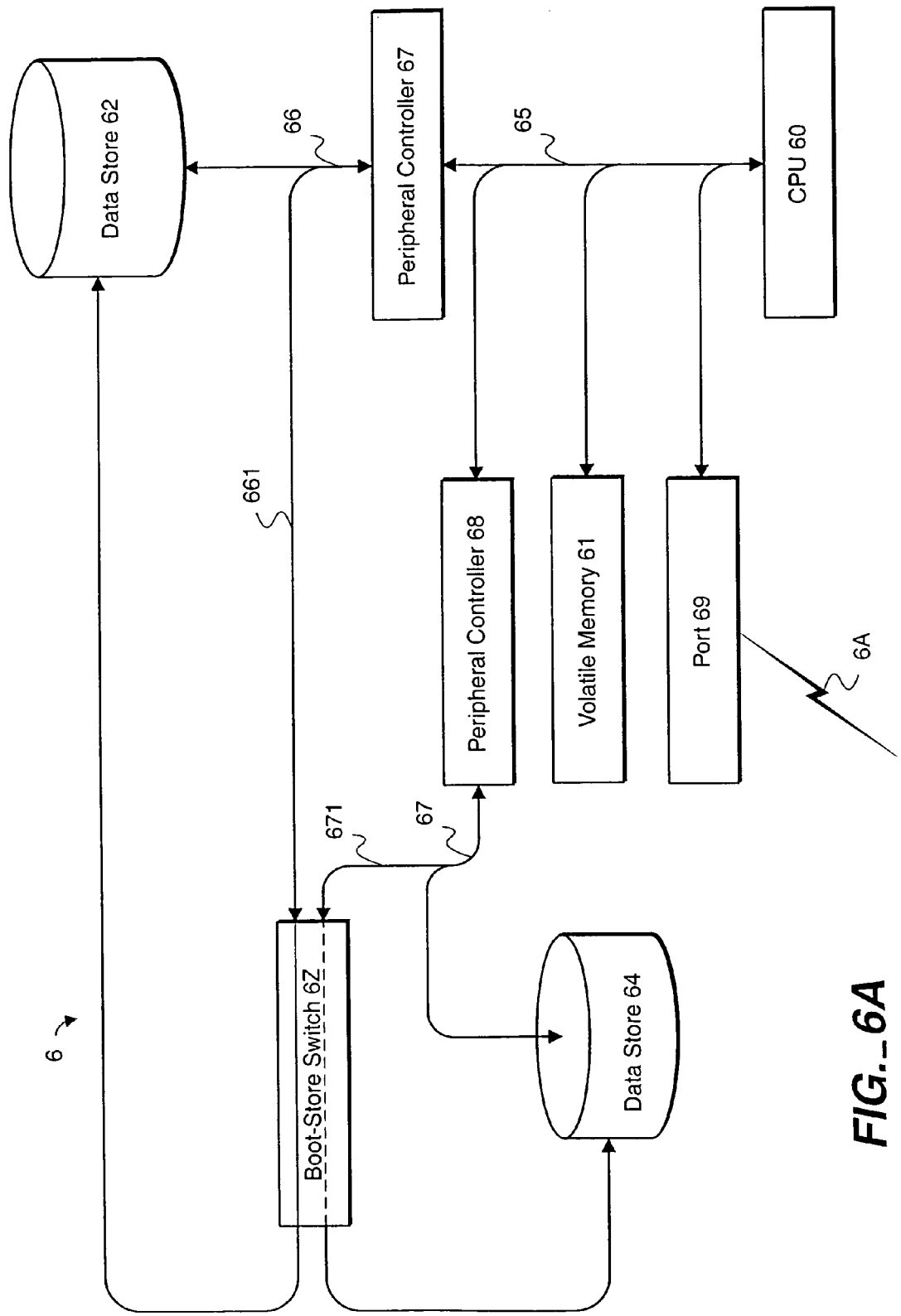
FIG._6A

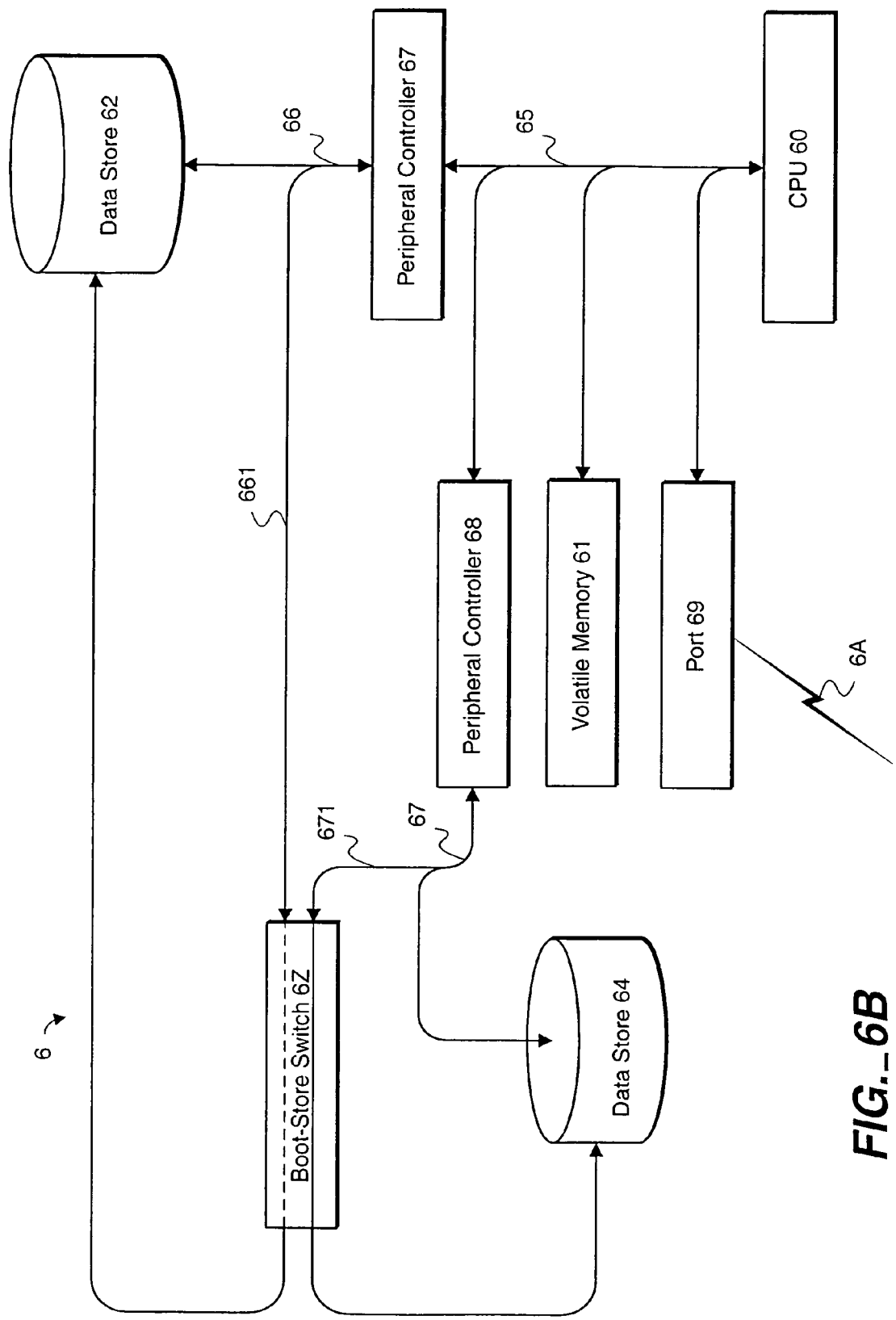
FIG._6B

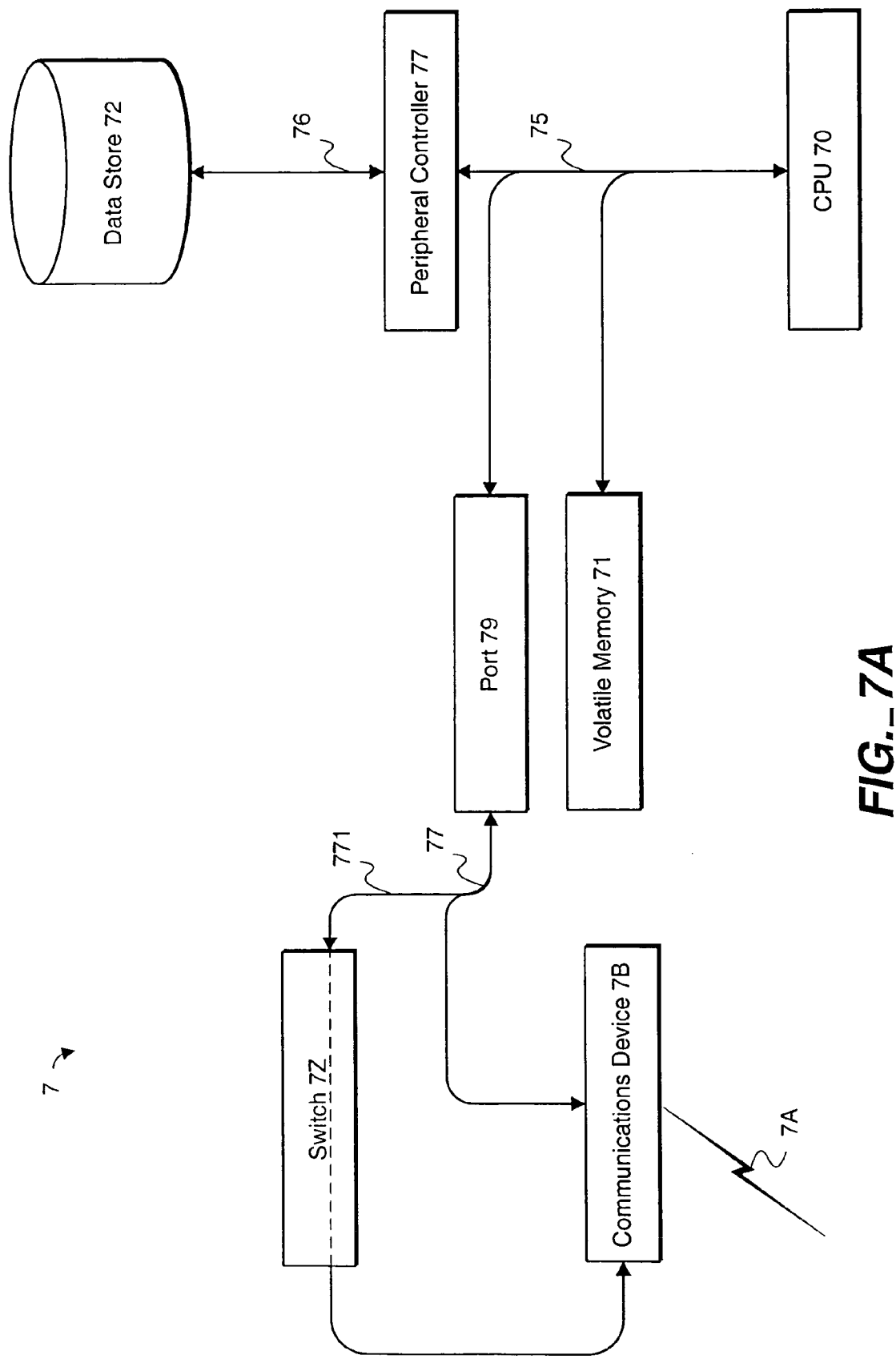
FIG._7A

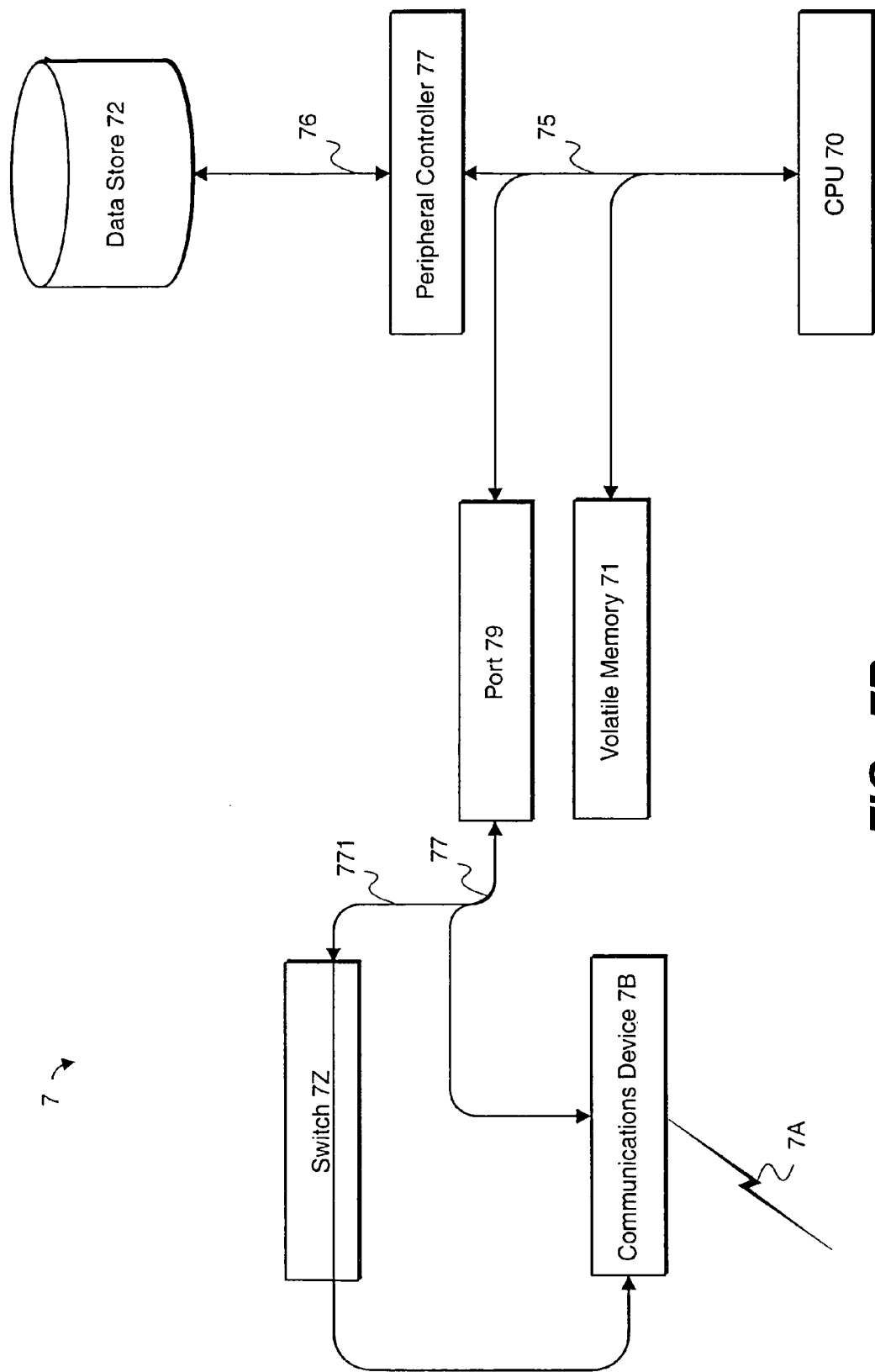
FIG.—7B

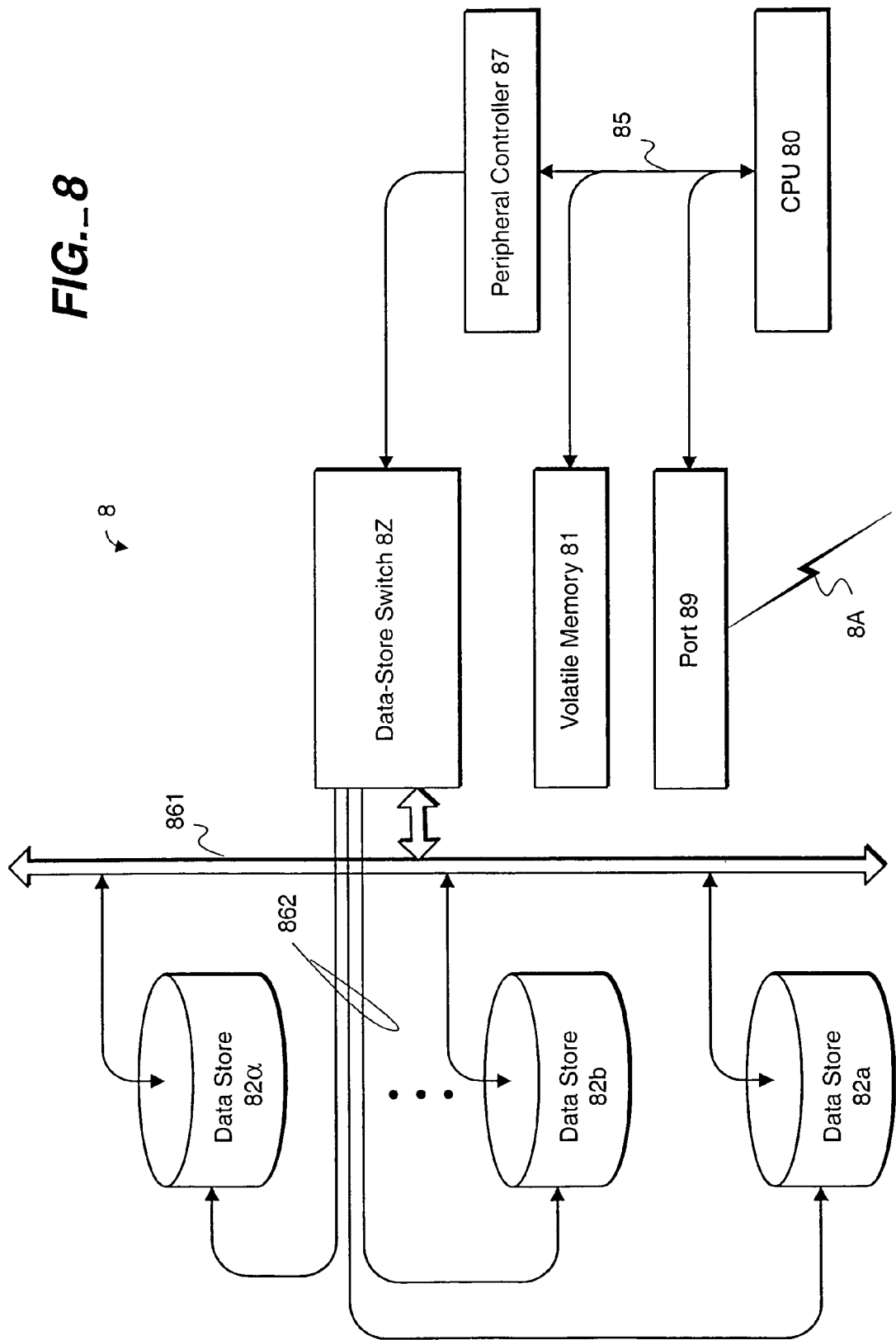

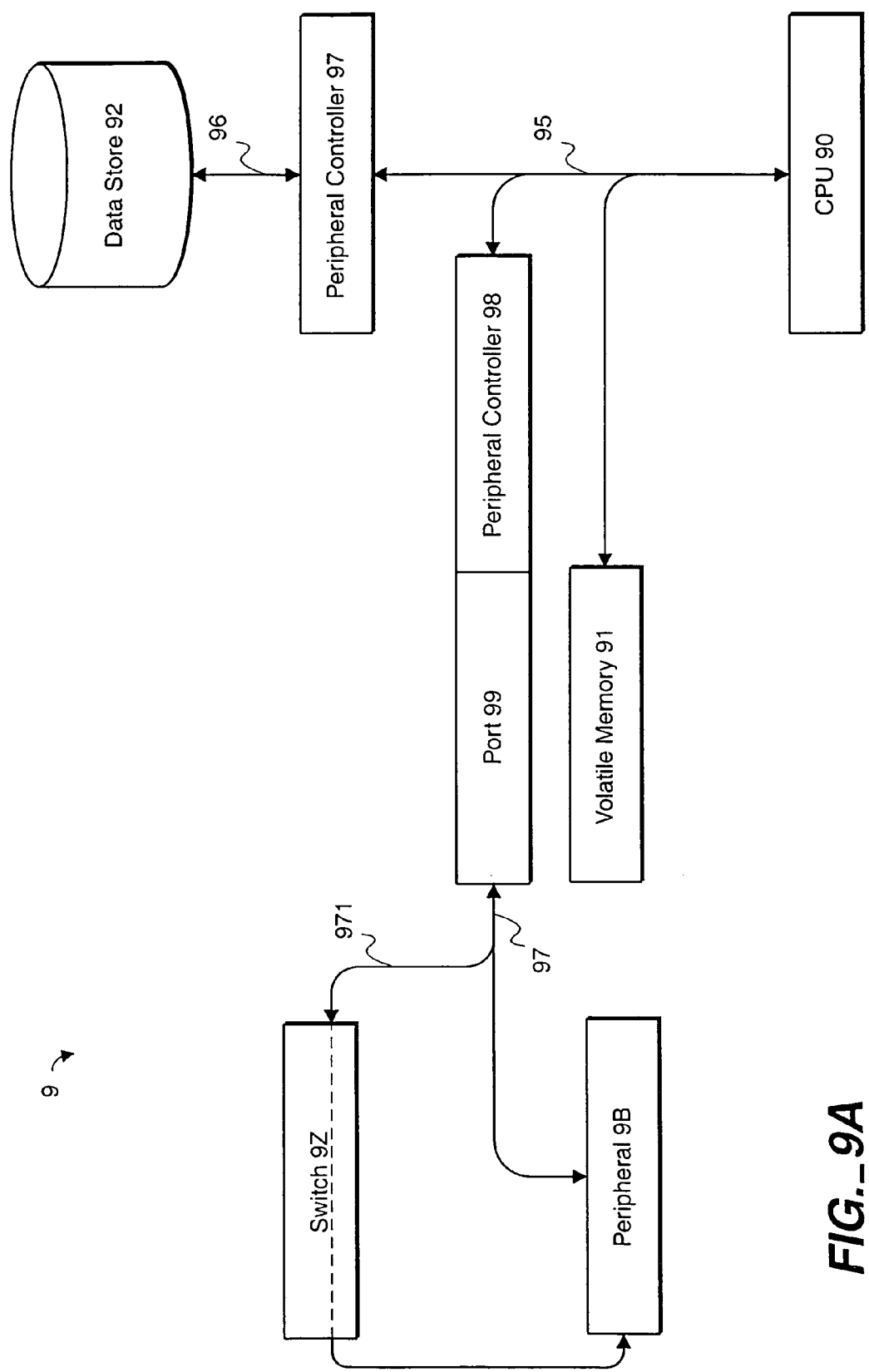
FIG._9A

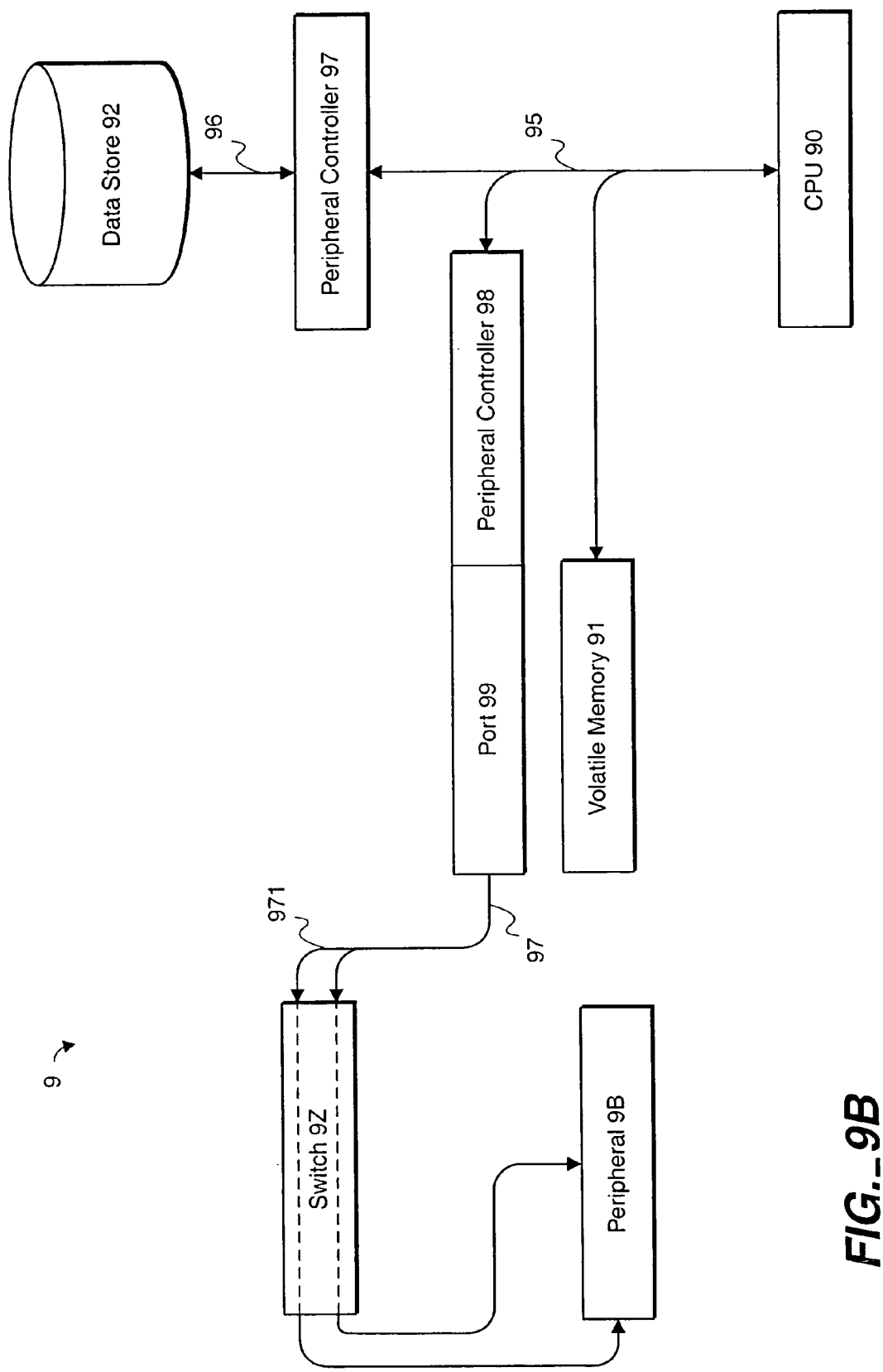
FIG._9B

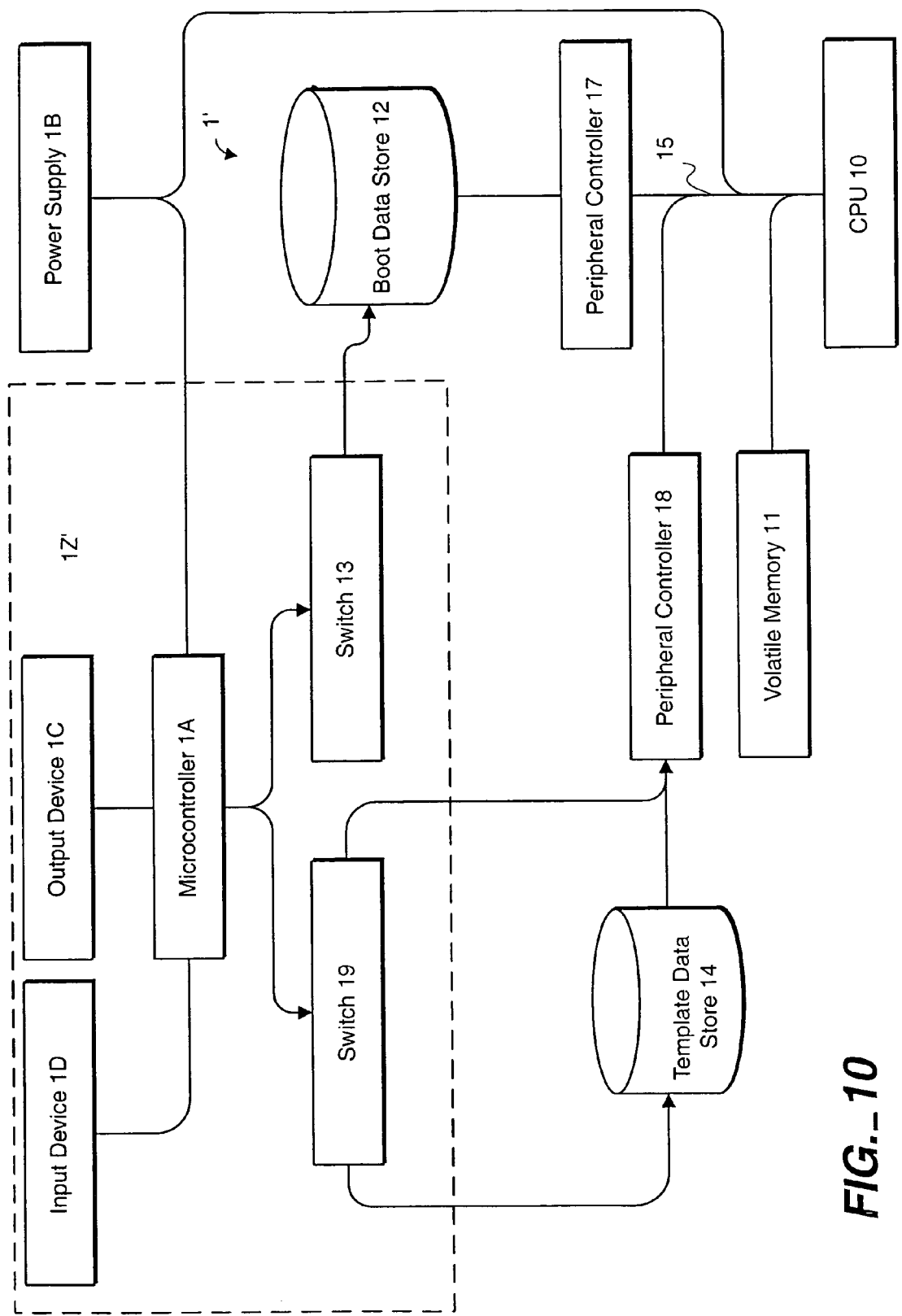
FIG._10

COMPUTER SYSTEM AND METHOD HAVING ISOLATABLE STORAGE FOR ENHANCED IMMUNITY TO VIRAL AND MALICIOUS CODE INFECTION

RELATED APPLICATIONS

This application is a continuation of U.S. patent application Ser. No. 10/075,136 filed on 19 Nov. 2001 and now U.S. Pat. No. 7,096,381; which is a continuation-in-part of U.S. patent application Ser. No. 09/862,898 now U.S. Pat. No. 6,880,110, filed on May 21, 2001, each of which patents and patent applications are hereby incorporated by reference.

This application also claims the benefit of the following applications:

U.S. Provisional Patent Application No. 60/205,531, entitled, "Scalable, Diagnostic, Repair and Multi-Use System for Computing Hardware & Devices That Utilize Computer Hardware," filed May 19, 2000, naming Kenneth Largman and Anthony More as inventors, and commonly assigned to Self-Repairing Computers, Inc. of San Francisco, Calif.; and U.S. Provisional Patent Application No. 60/220,282, entitled, "Scalable, Diagnostic, Repair and Multi-Use System for Computing Hardware & Devices That Utilize Computer Hardware," filed Jul. 24, 2000, naming Kenneth Largman and Anthony More as inventors, and commonly assigned to Self-Repairing Computers, Inc. of San Francisco, Calif. U.S. Provisional Patent Applications Nos. 60/205,531 and 60/220,282 are also incorporated by reference herein.

BACKGROUND

Personal-computer manufacturers and sellers often offer via-telephone and on-site repair services. Yet purchasers—particularly home, home-office and small-office purchasers—readily complain that their service contract offers less service than they expected. For example, a computer seller may dispatch a technician only after the purchaser calls the help center, performs a number of tests under the direction of the help center, escalates the problem at the telephone help center and performs redundant or additional tests under the direction of a putatively more knowledgeable telephone-help staff. The purchaser may have to escalate the problem still further and perform additional redundant tests before a repair technician is dispatched.

Frequently, the help center directs the customer to cycle the power on the computer, to re-boot the computer, to detach and reattach peripherals in question and to re-install application and operating-system software. Each call to the help center and each level of escalation may require the purchaser to cycle, re-boot, detach and reattach.

Detaching and reattaching peripherals can be extremely inconvenient. USB devices, for example, typically attach at the back of a computer in a location difficult to reach. In any event, the non-digerati purchaser may fear disassembling his computer, worrying that he may damage the computer further.

Help centers even direct a customer to reformat the boot drive of the computer and re-install operating-system and application software. Re-formatting is an onerous task for several reasons. Firstly, the home, home-office and small-office user rarely reformats a drive in the normal operation of his computer and is unfamiliar with the process itself. Secondly, reformatting destroys all the data on the drive, and such a user understandably becomes anxious on finding out that he will lose all of his data. Thirdly, such a user may not retain the application or operating-system installation media, especially where the seller pre-installs the software. The user may have been unsure which media to keep, or intending to keep a particular media, is in fact unable to locate that media later when needed.

Fourthly, the user typically does not back up his drives as often as an information technologist would recommend. That he will have to rely on his back ups (if any) if he is to have any hope of restoring his application is then not a comforting thought.

Accordingly, the art evinces a need for a computer that reduces or even eliminates the need for a user to call a help line, to keep installation media, to attach and reattach peripherals at the port, etc. Indeed, a computer that reduces or eliminates the technical savvy its user needs to effect repairs is desirable.

These and other goals of the invention will be readily apparent to one of ordinary skill in the art on reading the background above and the description below.

BRIEF DESCRIPTION OF THE DRAWINGS

FIG. 1 illustrates a computer incorporating an embodiment of the invention.

FIG. 2 is a schematic of a data-store switch according to an embodiment of the invention.

FIGS. 3A through 3B illustrate the switch-and-repair process according to one embodiment of the invention.

FIG. 4 illustrates the flow of control in a data-store switch according to one embodiment of the invention.

FIG. 5 illustrates a computer incorporating an embodiment of the invention.

FIGS. 6A, 6B illustrate a computer incorporating an embodiment of the invention. FIG. 6A illustrates the enabling of a data store in conjunction with the defeat of access to a communications link. FIG. 6B illustrates the enabling of a data store in order to support access to the communications link.

FIGS. 7A, 7B illustrate a computer incorporating an embodiment of the invention. FIG. 7A illustrates the computer in its Network Disconnected state, while FIG. 7B illustrates the computer in its Network Connected state.

FIG. 8 illustrates a computer incorporating an embodiment of the invention.

FIGS. 9A, 9B illustrate a computer incorporating embodiments of the invention.

FIG. 10 illustrates a computer incorporating an embodiment of the invention.

SUMMARY

Herein are taught apparatus and methods for a computer to repair itself, a virus- and hacker-resistant computer, a multi-user computer, a network-lockable computer, a multi-data store computer, a computer with peripherals that can be cycled, a computer configuration that is adapted to run two or more different programs at the same time on one computing system where the data and applications may be isolated from one another but may share output and/or input devices.

DESCRIPTION OF THE INVENTION

Overview

An example of the invention in use follows: A user runs an application on a computer incorporating an embodiment of the invention. At some point, the user modifies the application or underlying operating system to the point that the application, the operating system or both become unusable. Indeed, the user may no longer be able to even boot the operating system.

Recognizing that the computer needs to be repaired, the user throws a switch on the computer. The computer fixes the malfunctioning software and so informs the user.

The user can then re-boot the computer. On re-booting, the user again has access to a correctly functioning operating system, application and data files.

A Self-Repairing Computer

FIG. 1 illustrates a computer 1 incorporating an embodiment of the invention. The computer 1 may include a CPU 10, volatile memory 11, peripheral controllers 17, 18, a first non-volatile data store 12 and a bus 15, all well known in the art.

The computer 1 may also include switches 13, 19, a second non-volatile data store 14, a controller 1A, a power supply 1B, an output device 1C and an input device 1D.

The bus 15 may communicatively couple the volatile memory 11 and the peripheral controllers 17, 18 to each other and to the CPU 10. The peripheral controllers 17, 18 may communicatively couple with the data stores 12, 14, respectively.

The switches 13, 19, the controller 1A, power supply 1B, output device 1C and input device 1D may form a data-store switch 1Z. A data-store switch may alter the accessibility of a connected data store according to the setting of the switch.

The controller 1A may communicatively couple with the switches 13,19, the output device 1C and the input device 1D. The power supply 1B may supply the controller 1A (and other switch components) with power. More particularly, the power supply 1B may power the controller 1A independently of the power to the rest of the computer 1.

The power to the switch 1Z may come from the same source as the power for the rest of the computer (the wall outlet or laptop battery, for example). The switch 1Z may then be powered from that supply even when the rest of the computer 1 is not. FIG. 10 illustrates this embodiment of the invention.

The switch 13 may communicate with the data store 12. The switch may control (toggle, for example) the identification settings of the data store 12.

The switch 19 may couple to the data store 14. The switch 19 may control (toggle, for example) the power to the data store 14.

The volatile memory 11 may be random-access memory. The data stores 12, 14 may be magnetic disks, for example.

The output device 1C may be the monitor of the computer 1, LEDs or an LCD distinct from the monitor, for example.

FIG. 2 is a schematic of the data-store switch 1Z according to an embodiment of the invention. In FIG. 2, the opto-isolators U2, U3 implement the switches 13, 19, respectively. The Basic Stamp II microcontroller U1 (from Parallax, Inc., Rocklin, Calif.) implements the controller 1A. The battery V3 implements the power supply 1B. The LCD display port J1 represents the output device 1C, and the switches S1, S2 implement the input device 1D. (Opto-isolator U4 detects whether the computer 1 has power.)

In a first mode of operation herein termed "normal mode," the computer 1 may run a predetermined operating system and application. Accordingly, the data store 12 may contain a correctly functioning copy of that software. The CPU 10 may access the data store 12, boot the operating system and then execute that application.

The data store 12 is termed herein the "boot data store." The data store 12 may contain a bootable, executable operating system and executable application.

The data-store switch 1Z may make the data store 12 accessible to the computer 1 as the boot drive (by means of the switch 13, for example). The data-store switch 1Z may also make the data store 14 inaccessible to the computer 1 (by means of the switch 19, for example). Otherwise, the data-store switch 1Z may idle, waiting for user input on the device 1D.

In the normal stage, the computer 1 may perform as a conventional computer. The user may run his application software, inattentive to the invention incorporated into the computer 1.

In a third mode of operation herein termed the "repair mode," the CPU 10 may run software on the data store 14 and the controller 1A may execute a program in parallel. A mode intermediate to the normal and repair modes, herein termed the "switching mode," may effect the transition from normal to repair mode.

In the switching mode, using an input device such as the device 1D the user may indicate that he wishes to repair software on the data store 12. (FIGS. 3A and 3B illustrate the switch-and-repair process according to one embodiment of the invention.) In response to the input, the computer 1 may switch from normal operation to repair, step 310, and repair the software on the data store 12, step 320.

The switching of a data store may be logical or physical. Logical switching is switching enforced purely by software. For example, software may set one or more predetermined bits that it or other software tests to determine whether a data store is accessible at any given time.

A physical switch opens or closes a predetermined electrical circuit of a device to be switched. A physical switch may, for example, alter the open/close state of identification jumpers of a data store. A physical switch may turn on or off the power supply to a device to be switched.

FIG. 4 illustrates the flow of control in a data-store switch 1Z according to one embodiment of the invention. On start up, the data-store switch 1Z may go into normal mode of operation. In this stage, the switch 1Z may set the switch 13 to make the data store 12 the boot drive, step 4A3. The switch also may set the switch 19 to leave the template data store 14 unpowered.

The data-store switch 1Z may then idle, waiting for the user to initiate the switch to repair mode, step 4A5. The data-store switch 1Z may display a message indicating that it is in normal mode, step 4A1.

When the data-store switch 1Z receives an indication to switch to repair mode, the switch 1Z may ask the user to confirm this indication, step 4B5. Confirmation is preferable where the repair process is destructive before it is constructive. Confirmation is preferable also because the activation of the input device indicating the switch to repair mode may have been accidental or ill considered.

On confirmation if requested, the data-store switch 1Z may switch power to the data store 14, step 4B9, making the data store 14 accessible to the computer 1. The data store 14 may be permanently configured to be addressable as the boot drive when it is accessible. Accordingly, the address of the data store 12 may then change.

In normal operation, the data store 12 may be addressable as the boot drive. However, during the switch, the switch 1Z may change the identity (address jumpers, for example) of the data store 12 to something other than the boot-drive identity.

The computer 1 is now ready to enter the repair stage.

Switched physically to repair mode, the computer 1 may boot from the template boot drive. The booted program or some other program executed during the boot sequence (autoexec.bat, for example, on machines running Windows™ operating system from Microsoft Corp., Redmond, Wash.) may query the user.

In one embodiment, on rebooting the computer 1 may automatically repair the data drive 12. It copies software from the template data store 14 to the data store 12 without further direction from the user. Previously set user preferences may, however, direct the course of repair.

Thus, where the template data store 14 contains only application software, the repair process may copy over or re-install that application software from the template data store 12. Where the template data store contains operating-system and application software, the repair process may copy over or re-install the operating system first and then the application software.

Uninstallation or deletion of an application may precede re-installation or copying over of that software. Re-formatting of the data store 12 may precede re-installation or copying over of the operating system. Resetting of ROM-resident parameters may precede re-installation or copying over of operating-system or application software.

On completion of the repair, the repair software may direct the user to switch back to normal mode and re-boot the computer 1.

Alternatively, the repair process may be menu-driven. The repair process may present the user a sequence of options to determine what repair process to execute. For example, on re-boot in repair mode, the repair software may offer the choices of running the repair process, reviewing repair-process settings, updating the template software (the application, operating system or repair-process software itself) and quitting the repair process.

The template data store 14 may contain application software, operating-system software and repair-process software. The application software may include the executable software itself (.exe, .dll, .o, etc.) or the files created by the application (.wpd files for Corel WordPerfect word-processing software, for example).

The software on a template data store 14 typically is an operating system and may include one or more applications, along with the underlying software to run the operating system (and any included application) on a computer with a predetermined configuration. The underlying software may include one or more boot records, one or more partition tables or a BIOS.

The template software is created by installing software onto a data store, by copying installed software onto the data store or by copying installation software onto a data store. (Installed software includes data files and other pre-existing software.)

The template data store software may be updated. Where the template software is installation-ready software, that installation software may be updated to a different, usually later, version. Where the template software is a backup of the software on the data store 12, a different, usually more recent, backup of the data-store software replaces or supplements that software.

Repair-process settings may include whether to recover data, run a virus check, reformat the data store, revert to a backup, run a human-mediated (i.e., manual) or an automatic repair, run diagnostics (software or hardware, for example). Repair-process settings may also include whether to format and at what level (quick versus low-level, for example), what software to re-install (operating system (OS) only; OS and executable-application software; OS, executable-application software and application data files; data files only, for example), whether to switch automatically (i.e., under program or hardware control), what level of repair to run (quick, better or best, in one embodiment), whence to setup (backup or template, in one embodiment) and whence to recover data files (most recent backup prior to repair, backup at the time of repair, other predetermined backup, query-and-response-specified backup, as examples).

The repair process may entail recovering a usable version of the appropriate data file. In some instances of computer repair, the problem is not so much with the operating-system or executable-application software so much as with the files (usually data files) associated with one or more of the applications. If the application in question is Microsoft Outlook, then the file to be recovered may be the mail-and-folder-data .pst file. Where the application is Microsoft's Internet Explorer, the file to recover may be the favorites file.

Running a virus check may entail first checking that the virus-check-and-repair software is up to date. Because new software attacks appear daily, and because newer malicious code has a higher chance of delivering a payload, this is not a trivial step. The software may then check for malicious code and repair software, as directed by the user or by default.

The above process presupposes that the data store 14 contains a copy of (a version of) the operating-system, application software or data file on the data store 12. In this sense, this second data store 14 is termed herein the "template data store." With the computer 1 switched to boot from the template data store 14, the computer 1 may perform the original copying of template software onto the data store 14. (Where the data store 14 is a read-only medium, it may arrive at the computer 1 in a pre-written state.)

An example of the operation of the computer 10 follows: Assume that the data store 12 contains a bootable Windows™ operating system (from Microsoft Corp., Redmond, Wash.). Assume also that the data store 12 also contains NaturallySpeaking® application software (Lernout & Hauspie, Ieper, Belgium and Burlington, Mass.).

The operating system and the application on the data store 12 may have each been run any number of times, and the user may have customized the operating system, the application or both to his preferences. In contrast, the template data store 14 may contain as-installed copies of the operating-system and the application software.

In the course of using his computer 1, the user puts the computer 1 into an undesirable state. He may, for example, foul up the optional settings of the operating system or application such that he cannot reset them to a usable state. He may download a virus, Trojan horse or other malicious code that changes his operating system, application or both. The particulars of the malicious code are unknown but the manifest effect is that the computer 1 is partially or completely inoperable. He may remove files critical to the correct operation of the software. As one of skill in the art will recognize, the ways in which software may be intentionally or unintentionally altered to the point of unusability are legion.

Recognizing that his computer 1 is in an undesirable state, the user activates the switch 13, step 300. FIG. 3 illustrates the switch-and-repair process according to one embodiment of the invention, and step 310 illustrates the actual switching. In response to the switch activation, step 300, the computer 1 repairs the software on the data store, step 320.

The repair process involves copying software from the template data store 14 to the data store 14. The software on the template data store 14 may be a master copy, a backup copy or an archive copy of software on the data store 12. (An archive is a copy of software, which copy cannot be overwritten or deleted.)

With template software on the template data store 14, the computer 1 may re-install or copy over software onto the data store 12. The computer 1 may overwrite all or part of any software on the data store 12.

The computer 1 may offer the user options as to how thorough its attempt to repair itself should be. In one embodiment, the computer 1 offers the options of a "Quick Repair," a "Better Repair," a "Best Repair" and a "Test." A Quick Repair may, for example, re-install or copy template software from the data store 14 onto the data store 12 without first re-formatting the data store 12. The Better Repair may perform a high-level re-format of the data store 12 before that copy or re-installation. A Best Repair may perform a low-level re-format of the data store 12 before copying over or re-installing software.

FIG. 4 illustrates the switch-and-repair process in more detail, according to one embodiment of the invention. The switching copies software from the template data store onto the data store, replacing the unusable software on the data store.

A number of situations occur where the computer 1 may effect repair without rebooting. For example, if only data files or application executables need to be repaired, then shutting down the operating system booted from the data store 12 is not usually necessary—especially in newer operating systems such as Windows 2000 (Microsoft) and more sophisticated operating systems such as Linux .

Further, a large number of operating-system files can be repaired (for example, by replacement) without shutting down the operating system. Repairing the operating system without rebooting is a preferred embodiment.

Still further, for backups (automated or otherwise), continuing to run from the data store already booted may be preferable. Where the computer 1 can become sufficiently quiescent that a backup from the data store 12 to the data store 14 can occur while still booted from the data store 12, then such a backup is quicker than shutting down and backing up the data store 12 while booted from the data store 14.

Where the data store 12 remains the boot drive when the data store 14 is simultaneously available, the data store 14 may be addressable as other than the boot drive. The address of the data store 14 may be switched similarly to the address switching of the data store 12.

A Virus- and Hacker-Resistant Computer

FIG. 6A illustrates a computer 6 incorporating an embodiment of the invention. The computer 6 may include a CPU 60, volatile memory 61, peripheral controllers 67, 68, first and second non-volatile data stores 62, 64, data port 69, communications link 6A and buses 65, 66, all well known in the art. The computer 6 may also include a data-store switch 6Z.

The bus 65 may communicatively couple the volatile memory 61, the peripheral controllers 67, 68 and the data port 69 to each other and to the CPU 60. The peripheral controllers 67, 68 may communicatively couple with the data stores 62, 64, respectively. The data port 69 may mediate access to the communications link 6A.

The bus 66 may communicatively and electrically couple the peripheral controller 67 to the data store 62 and to the boot-store switch 6Z. More specifically, the boot-store switch 6Z may switch the power line 661 of the bus 66, thus powering up or down the boot store 62.

Likewise, the bus 67 may communicatively and electrically couple the peripheral controller 68 to the data store 64 and to the boot-store switch 6Z. The boot-store switch 6Z may switch the power line 671 of the bus 66, powering up or down the boot store 64.

The port 69 may link the computer 6 to other devices such as a modems, networks, etc. as indicated by the communications link 6A.

The computer 6 may operate in two states: Connected and Disconnected. In the Disconnected state, the computer 6 does not use the data port 69 to communicate and the data-store switch may enable the data store 62.

By contrast, in the Connected state, the computer 6 may use the data port 69 to obtain data over the communications link 6A. In the Connected state, the switch may enable the second data store 64.

Thus, the computer 6 may enable only one of the multiple data stores 62, 64 at any given time, which depending on whether it is accessing the communications link 6A. This isolates data received over the communications link 6A to one of the data stores, namely, the data store 64. Where the data received was maliciously created (a virus or a hacking executable), this data is confined to the data store 64.

The switching of the data stores 62, 64 may be done under manual, hardware or software control. A mechanical throw switched by the user when the user wishes to access (or cease accessing) the communications link exemplifies a manual switch. A boot-store switch 6Z that responds programmatically to the CPU 60 illustrates a software-controlled switch.

For example, if the user boots an Internet browser and the communications link 6A is the Internet, then the CPU 60 may programmatically recognize the (intended) launch of a browser and initiate the switch of the data stores 62, 64. The switch may involve re-booting the computer 6 in order to make the second data store 64 the only data store available during the use of the communications link 6A. (A browser on the data store 64 may launch automatically on the boot from the data store 64.)

In one embodiment, the computer may synchronously switch the port 69 and the second boot store 64. This may improve the resistance of the computer 6 to hacking or infection.

FIG. 6A illustrates the enabling of the data store 62 in conjunction with the defeat of access to the communications link 6A. The solid line continuing the power line 661 through the boot-store switch 6Z illustrates the accessibility of the data store 62. Conversely, the dashed lined through the switch 6Z illustrates the inaccessibility of the data store 64.

FIG. 6B illustrates the enabling of the data store 64 in order to support access to the communications link 6A. The solid power line through the boot-store switch 6Z illustrates the accessibility of the data store 64. Conversely, the dashed lined through the switch 6Z illustrates the inaccessibility of the data store 62.

The data store 64 may contain application software to process the data received over the link 6A. In such a setting the need to migrate the data on the data store 64 to the data store 62 may be minimal or non-existent.

Where, however, the application to process the data received over the link 6A and stored on the store 64 resides on the data store 62, then a process of migration is necessary. A predetermined time after receiving data over the link 6A, the computer may simultaneously enable the data stores 62, 64 and copy the data received to the data store 62 for processing there. The delay allows, for example, anti-virus software providers to produce and distribute security software addressing threats that have come to light since the time of receipt of the data.

The migration process may be manual or automatic.

A Lockable Network Computer

FIG. 7A illustrates a computer 7 incorporating an embodiment of the invention. The computer 7 may include a CPU 70, volatile memory 71, a peripheral controller 77, a non-volatile data store 72, a data port 79, a communications link 7A and buses 75, 77, all well known in the art. The computer 7 may also include a switch 7Z.

The bus 75 may communicatively couple the volatile memory 71, the peripheral controller 77 and the data port 79 to each other and to the CPU 70. The peripheral controller 77 may communicatively couple with the data store 72. The data port 79 may mediate access to the communications link 7A.

The bus 77 may communicatively or electrically couple the data port 79 to the communications device 7B.

The port 79 may link the computer 7 to other communicators through a communication device 7B and over a communications link 7A. Examples of the communications device 7B and link 7A include an acoustic modem 7B and a POTS telephone line 7A; a tap 7B and an Ethernet 7A; and a wireless modem 7B and radiation-permeable space 7A.

The switch 7Z may switch a power line 771 of the bus 77, thus powering up or down the communications device 7B. The switch 7Z may switch (tri-state, for example) a data line 771 of the bus 77, thus interrupting or enabling the ability of the communications device 7B to transfer data to the data port 79.

The computer 7 may operate in two states: Network Connected and Network Disconnected. FIG. 7A illustrates the computer 7 in its Network Disconnected state, while FIG. 7B illustrates the computer 7 in its Network Connected state. (The solid line continuing the power line 761 through the switch 7Z illustrates the continuity of the power or data line 771, and dashed lined through the switch 7Z illustrates the discontinuity of that line 771.

In the Network Disconnected state, the switch 7Z may disconnect the communications device 7B from communicating on the data port 79. Accordingly, none of the software running on the computer 7 may access the communications link 7A.

By contrast, in the Network Connected state, the switch 7Z may enable the communications device 7B to communicate on the data port 79. Accordingly, software on the computer 7 may access the communications link 7A.

An exemplary use for the computer 7 is where a parent uses the computer 7 to access, say, his employer's computer network via a virtual private network (VPN) over the Internet 7A. The parent also wants his child to be able to use the computer 7 for school or recreation—but without access to the Internet 7A. The parent thus switches the computer 7 into the Network Enabled state when he (the parent) wants to use it, and switches the computer 7 into the Network Disconnected state when the child is to use the computer 7.

The switching of the data stores 72, 74 may be done under manual, hardware or software control. A mechanical switch thrown by the user when the user wishes to access (or cease accessing) the communications link 7A exemplifies a manual switch. A mechanical switch that may be locked with a key, for example, is preferable.

A switch 7Z that responds programmatically to the CPU 70 illustrates a software-controlled switch 7Z. (The CPU 70 may respond to any kind of input, including keystrokes, voice commands, biometric data and data received over a network.) A hardware switch 7Z may be considered as an analog computer.

A computer 7 running an operating system that supports hot swapping offers an advantage. The addition and removal of the communications device 7B from the computer 7 may confuse OSs that do not permit hot swapping of peripherals.

A Multi-Data Store Server

FIG. 8 illustrates a computer 8 incorporating an embodiment of the invention. The computer 8 may include a CPU 80, volatile memory 81, a peripheral controller 87, multiple non-volatile data stores 82a, 82b, . . . 82α, a data port 89, a communications link 8A and a bus 85, all well known in the art. The computer 8 may also include a data-store switch 8Z and a bus 86 consisting of the buses 861 or 862.

The bus 85 may communicatively couple the volatile memory 81, the peripheral controller 87 and the data port 89 to each other and to the CPU 80. The data port 89 may mediate access to the communications link 8A.

The peripheral controller 87 may communicatively couple with the data-store switch 8Z. The data-store switch 8Z in turn may communicatively or electrically couple to the data stores 82. The bus 861 may communicatively couple the data path of the switch 8Z to those of the data stores 82, and the bus 862 may electrically couple a power supply in or through the switch 8Z to the data stores 82.

The data port 89 may mediate access to the communications link 6A. The port 89 links the computer 8 to other communicators over the communications link 7A.

The computer 8 may operate in any of N states, where N is the number of data stores 82. In a first state, the data-store switch 8Z enables the first data store 82a to communicate with the peripheral controller 87. In the second state, the switch 8Z enables the second data store 82b to communicate with the peripheral controller 87, and in the Nth state, the switch 8Z enables the Nth data store 82α to communicate with the peripheral controller 87.

The corruption or other failure of the data store 82 currently communicating with the controller 87 prompts the switching from one state to another, and thus from the failed data store to another, working data store 82. (The failed data store 82 may then be repaired in place, or it may be removed and repaired, removed and replaced, or removed permanently.)

Where, for example, the computer 9 is a web server and the communications link 8A is the Internet, the multiple data stores 82 may provide resistance against infection and hacking by malicious users of the Internet 8A. If the hackers succeed in corrupting the data store currently attached to the peripheral controller, then a switching may occur from that corrupted data store 82 to another correct data store 82. This switching may occur very quickly (preferably as quickly as possible) in order to minimize the loss of access to the data on the data stores 82.

The switching may be manual, hardware or programmatic. For example, a diagnosis program may execute periodically to determine the health of the currently accessible data store 82.

A Computer with Peripherals that can be Cycled

FIG. 9A illustrates a computer 9 incorporating an embodiment of the invention. The computer 9 may include a CPU 90, volatile memory 91, a controllers 97, 98, a non-volatile data store 92, a port 99, a peripheral 9B and buses 95, 97, all well known in the art. The computer 9 may also include a switch 9Z.

The bus 95 may communicatively couple the volatile memory 91, the controllers 97, 98 to each other and to the CPU 90. The controller 97 may communicate with the data store 92. The controller 98 may communicate with the peripheral 9B.

The bus 97 may communicatively or electrically couple the port 99 (and thus the controller 98) to the peripheral 9B.

The peripheral 9B may be any computer peripheral. Examples include printers, USB devices, scanners, fax machines, data stores and keyboards.

The switch 9Z may switch a power line 971 of the bus 97, thus powering up or down the peripheral 9B. The switch 9Z may switch one or more data lines 972 of the bus 97, thus disabling or enabling the peripheral 9B to transfer data to the port 99.

A user of the computer 9 may be using the peripheral 9B, transmitting or receiving data on the from the device 9B as expected. The switch 9Z is supplying power to the peripheral 9B.

At some point, the computer 9 becomes unable to communicate with the peripheral 9B. This may be caused by an error in the software or hardware of the computer 9, including software or logic of the peripheral 9B.

The user attempts to revive communications with the peripheral 9B. The user may. for example, cycle the power to the peripheral 9B. Thus, the user changes the state of the switch 9Z such that the switch 9Z goes from powering to the peripheral 9B, to not powering that peripheral 9B, to again powering that peripheral 9B. This switching may be done manually, in hardware, or programmatically.

The cycling of the peripheral 9B may resolve the communication problem that the user was experiencing. For example, where the problem was with the software or logic of the peripheral 9B, then the power cycling may clear the software or logic state of the peripheral 9B. Where the problem was with the software or logic of the computer 1, cycling the power may clear the software or logic state f the controller 97 or applications running in the memory 91.

FIG. 9B illustrates an alternate embodiment of the computer 9. The switch 9Z switches both power and data lines.

A Multi-User Computer

FIG. 5 illustrates a computer 5 incorporating an embodiment of the invention. The computer 5 may include a CPU 50, volatile memory 51, a peripheral controller 57, multiple non-volatile data stores 52a, 52b, . . . 52α and a bus 55, all well known in the art. The computer 5 may also include a data-store switch 5Z and a bus 56 consisting of the buses 561 or 562.

The bus 55 may communicatively couple the volatile memory 51, the peripheral controller 57 and the data port 59 to each other and to the CPU 50.

The peripheral controller 57 may communicative with the data-store switch 5Z. The data-store switch 5Z in turn may communicatively or electrically couple with the data stores 52. The bus 561 may communicatively couple the data path of the switch 5Z to those of the data stores 52, and the bus 562 may electrically couple a power supply in or through the switch 5Z to the data stores 52.

The computer 5 may operate in any of N states, where N is the number of data stores 52. In a first state, the data-store switch 5Z enables the first data store 52a to communicate with the peripheral controller 57. In the second state, the switch 5Z enables the second data store 52b to communicate with the peripheral controller 57, and in the Nth state, the switch 5Z enables the Nth data store 52α to communicate with the peripheral controller 57. Only one data store 52 may access the peripheral controller 57 at any given time.

In one embodiment, the computer 5 has only one controller with multiple devices. In another embodiment, the computer 5' has multiple controllers, each with respective multiple peripherals. The switching then switches among the multiple peripherals of the first controller, the multiple peripherals of the second controller, etc. (The multiple controllers need not have the same number of multiple peripherals.)

Each data store 52 may contain self-contained software for a respective user or group of users. Each data store 52 may contain a bootable operating system, and optionally such application or data files as the user(s) corresponding to the data store 52 may require or desire.

Each user or group of users may use only a predetermined one (or more) of the data stores 52. Thus, before using the computer 5, a user sets the switch 5Z to the predetermined position enabling the data store 52 corresponding to that user to communicate via the controller 57.

In this way, a first user's data is separated from a second user's data on the same computer. The computer 5 more effectively separates users' data by enforcing security at a physical level rather than at the logical (software-enforced) level typical of multi-user operating systems.

In this scenario, re-booting between switches is desirable. Re-booting clears out the memory 51 in the switch from one user to another. Also desirable is a multi-key, multi-position lock. Any one key may turn the lock to any one predetermined position, enabling one corresponding data store 52.

The invention now being fully described, one of ordinary skill in the art will readily recognize many changes and modifications that can be made thereto without departing from the spirit of the appended claims. For example, in addition to switching software, data stores or other peripherals as described above, a computer may also switch properly functioning hardware for malfunctioning hardware. Indeed, in a computer with multiple mother boards, a switch may switch the functioning components of a computer from one board to another.

Also, while the description above usually uses data stores as the devices to switch, one of skill in the art will readily now realize that other computer components may be switched, including logic boards, ROM and controllers.

Under certain circumstances, danger or damage may follow from switching when power is supplied. Accordingly, a switch may be deactivated when such danger or damage may result. Logic such as the controller 1A may prevent dangerous or damaging switching by tracking power states, device identities, etc. and permitting switching, for example, when no electrical current is flowing to the devices to be switched.

Preferably, the switch is located in an easy-to-reach location. This contrasts with the typical location of USB, keyboard and other ports, for example.

Additional embodiments and aspects of the invention are now described. It will be noted that the invention further provides an apparatus and method of supporting the backup and recovery of a computing device. The computing device will typically include both a user computing environment and a supporting environment which enhances the stability and functionality of the user computing environment.

Embodiments of processes, different computing systems, snap-shot of data, monitoring, recovery, application configuration and application output are now described in turn.

Processes

In one embodiment, a plurality of computing processes may be utilized to enable the On-the-Fly invention. Here, individual computing processes may monitor, track, predict the stability, backup, restore, or recover attributes within the user computing environment. The attributes may be software specific, data specific, operating system specific, or any combination. Utilization of the plurality of computing processes can facilitate the normal operation of the user computing environment. In one embodiment the user computing environment may be stabilized without user intervention such as requiring the user to shut-down, restart, logging off, logging on, or terminating applications. In one embodiment the supporting environment may have a capability interacting with the user computing environment. In one embodiment the supporting environment may be capable of initiating or causing the user computing environment to shut-down, restart, logging off, logging on, or terminating applications.

Different Computing Systems

In one embodiment the user computing environment and the supporting environment function in different computing systems. The two computing systems may reside in a common box. The user computing system may consist of data storage devices, RAM, processor, video card, and other attributes known in the art to facilitate a computing system. The supporting computing system may consist of a master template data storage device, RAM, processor, and other attributes known in the art to facilitate a computing system. In one embodiment, the data storage devices may be linked as needed to perform repairs. Such as, the need to copy data from the support environment to the user environment.

Snap-Shot of Data

In one embodiment, the present invention takes a snap-shot of the user computing environment. This snap-shot may subsequently be utilized to restore, analyze, or enhance the stability of the user environment. The snap-shot may include a stable image of the operating system, software applications, or user data. The snap-shot may contain an idealized or stable version of a disk drive utilized by the user environment, or a subset of the disk drive such as an individual partition. The snap-shot may also include an idealized version or image of the user system RAM, user system disk drive, user system partition image, memory of the video card, or any other memory stored or utilized in the user computing environment. These snapshots may be stored in the associated support environment data storage device.

Monitoring

The supporting environment may monitor the user environment. The monitoring may include monitoring of processes running or enabled within the user environment. The monitoring may include monitoring both the utilization of the data storage device, data contained on the data storage device, and other aspect necessary for the normal operation of the user environment. This monitoring may facilitate identifying undesired changes, potential problems and also potential solutions. The supporting system may detect a freeze or other undesirable change within the user environment.

Recovery

When an undesirable change is detected in the user environment, the supporting environment may attempt to recover or restore or repair the user environment. The supporting system may be capable of re-enabling the user environment in a number of ways, such as resetting the keyboard in the event the keyboard locks the communication of keystrokes to the user environment. Further recovery of the user environment may be supported by reset connections such as describe by "Freezebuster", reset and clear devices as needed, replace defective software components as needed, and/or switch hardware components and/or devices as needed. The supporting environment and or supporting system may copy all or part of the data from one or more of the idealized snapshots mentioned above. These snapshots may be copied into their respective devices and/or locations.

Application Configuration

Another embodiment supports an ability to run two or more different programs at the same time on one computing system where the data and applications may be isolated from one another but may share output and/or input devices. In one embodiment, the applications may be isolated by executing the applications in a separate address space. The applications and data may be further isolated by utilizing two separated data storage devices. In order to safely send a command from one isolated data storage device to the other isolated data storage device the following may be utilized. In one embodiment, when an icon on the desktop icon is clicked the following may occur. The icon may execute a command that would launch a specific application on the other isolated data storage device. This may be accomplished by a shared ASIC that sends the command to the other isolated data storage device.

Another embodiment involves isolation of data with merged display. In this embodiment two user environments can be separated for the purposed of isolating data. For the AntiHacker System: A hard drive that does not contain "sensitive" data could be isolated and attached to a network. A second hard drive, may or may not be attached to the other hard drive (in any way), could be utilized for "sensitive" user data, but have no exposure to the network because it is "isolated" by a means of switching. The video signals associated with the data coming from these two hard drives could then be "merged" onto the same screen. In other words, all of the computing would be happening within isolated "secure zones" within a single computer but would not appear so to the user. Another example: the anti-virus system could use this method to isolate potentially infectious data.

Application Output

Applications may have its output displayed on the same screen alongside and/or superimposed upon the same screen with other applications and data that were being "computed" separately. Both computing processes may be separated but may then be "merged" together on the screen, and/or overlaid one another on the same screen. In one embodiment, this may be achieved by using multiple video cards. This concept can be applied for example to the Repair System, Multi User, Anti-Hacker, anti-theft and Anti-Virus.

In another embodiment both the user computing environment and the supporting environment will reside on a single computer system. A snap-shot of the operational user environment will be taken. The snap-shot will be associated with the supporting environment. Processes associated with the supporting environment will monitor the activities and status of the user computing environment. The monitoring function will become aware of any degraded performance of the user computing environment, such as a system freeze up. The monitoring function notifies the supporting environment of any degraded performance. The supporting environment will perform any recovery action as necessary to recover or restore the user environment. Recovery may include utilizing the snap-shot to recover or restore the user environment. An entire user disk may be restored. A specific application or software package may be restored, or particular files.

We claim:

1. A computer that has enhanced resistance or immunity to viral, Trojan-horse, hacker, or other malicious code infection, the computer comprising:

a processor;

a memory coupled to the processor;

a plurality of identified storage; and a switch selectively enabling access with only one of the plurality of storage with said processor and said memory by opening or closing a predetermined electrical circuit of a device to be switched;

the selectively enabling access to the one storage disabling access among or between the processor, memory and another of the plurality of identified storage, wherein only a single storage is accessed at a time, preventing a virus, a hacking executable code, an infection, or other harmful or malicious element from executing or from contaminating another storage;

a data port and means for mediating access of the computer over an external communications link with an external system;

and the computer being operable in a connected state and in a disconnected state;

the disconnected state being a state in which (i) the computer is prevented from communicating over the data port, and (ii) the data-store switch may enable access with any plurality of storage including permitting access with the first storage and the second storage;

the connected state being a state in which (iii) the computer is permitted to communicate over the data port, and (iv) the data-store switch may not enable access with the first storage but may enable access with the second storage; and the permitting or preventing access to particular storage depending on whether the computer is communicating or not communicating with an external system via the data port and operable for isolating data received only to the second storage so that if the data received has a virus, a hacking executable code, an infection, or other harmful or malicious element it is confined to the second storage.

2. A computer as in claim 1, wherein the plurality of identified storage includes a first storage and a second storage.

3. A computer as in claim 1, wherein the plurality of identified storage comprise different logical storage.

4. A computer as in claim 1, wherein the plurality of identified storage comprise different physical storage.

5. A computer as in claim 1, wherein the plurality of identified storage comprise at least one hard disk drive physical storage device.

6. A computer as in claim 1, wherein the second storage is separated from the processor and cannot execute the data received.

7. A computer as in claim 1, wherein at least some of the plurality of storage are adapted to store data selected from the set of data consisting of user data, computer system data, operating system data, application program data, application program executable computer program code, operating system computer program executable code, including at least one of user data and program data.

8. A computer as in claim 1, wherein the switch disables access with the first data store so that the computer may enable only one of the plurality of data stores at any given time, which depending on whether the computer is accessing or not accessing the communications link, and thereby isolating data received over the communications link only to said second storage so that if the data over the communications link has a virus, hacking executable, infection, or maliciously created data element it is confined to the second storage.

9. A computer as in claim 1, further comprising:
a first bus communicatively coupling the memory, first and second peripheral controllers and the data pod to each other and to the processor;
a second bus communicatively and electrically coupling the peripheral controller to the first storage and to the switch;
a third bus communicatively and electrically coupling the second peripheral controller to the second storage and to the switch; and
wherein the switch includes a switching element for switching an operating signal of the second bus thus communicatively or electrically coupling the storage, and the switch element switching an operating signal of the second bus thus communicatively or electrically coupling the second storage.

10. A computer as in claim 9, wherein the computer further comprises multiple mother boards each having a processor and a memory coupled to the processor, and the switch includes a switching element for switching the functioning components of a computer from one board to another so that different mother boards, processors, memories, and storage may be selectively allocated to different users or to different user processes to provide physical security.

11. A computer as in claim 9, wherein the operating signal comprises a power line signal and the communicatively or electrically coupling comprises powering-up or powering-down the bus.

12. A computer as in claim 9, wherein the switching of the first and second storage may be done at least in part tinder manual control, hardware control, software control, or a combination of these.

13. A computer as in claim 9, wherein when the switching is accomplished at least in part by a manual switch, the mechanical switch comprises a mechanical switch operated by a user of the computer when the user wishes to access or cease accessing the communications link.

14. A computer as in claim 9, wherein when the switching is accomplished at least in part by a software-controlled switch, the software-controlled switch comprises a switch responding programmatically to the processor of the computer.

15. A computer as in claim 1, wherein the software controlled switch comprises said manual switch.

16. A computer as in claim 1, wherein the switching between the disconnected mode and the connected mode is initiated by an event.

17. A computer as in claim 1, wherein the switch involves re-booting the computer in order to make the second storage the only storage available during the use of the communications link.

18. A computer as in claim 1, wherein the computer synchronously switches the data port and the second storage so that the resistance of the computer to hacking or viral or other malicious code infection is enhanced.

19. A computer as in claim 1, wherein access to the second storage is disabled by stopping operating power to the second storage via the switch.

20. A computer as in claim 1, wherein access to the second storage to support access to communications link is enabled by supplying operating power to the second storage via the switch.

21. A computer as in claim 1, wherein access to the first storage is disabled by stopping operating power to the data store via the switch.

22. A computer as in claim 1, wherein access to the first storage to prevent infection during access to communications link is disabled by denying an operating signal to the first storage via the switch.

23. A computer as in claim 1, wherein the second storage contains application software to process the data received over the communications link and there is no need to migrate the data on the second storage to the first storage for processing.

24. A computer as in claim 1, wherein a migration of the data received is performed a predetermined time after receiving data over the communications link.

25. A computer as in claim 24, wherein during a delay in migration anti-virus software is applied to address security issues for the data.

26. A computer as in claim 25, wherein the migration is manual.

27. A computer as in claim 25, wherein the migration is automated.

28. A computer as in claim 1, wherein received data is placed in a quarantined isolated storage for a period of time.

29. A computer as in claim 28, wherein the quarantined isolated storage is selectively coupled with the processor and memory for a period of time but maintained in isolation from other of the plurality of storage.

30. A method for enhancing resistance or immunity to viral, Trojan-horse, hacker, or other malicious code infection in a device of the type having a processor, a memory coupled to the processor, and a least one physical storage, the method comprising:
   identifying a plurality of storage from said at least one physical storage including a logical or physical first storage and a second logical or physical storage; and
   selectively enabling access with only one of the plurality of identified storage with said processor and said memory by opening or closing a predetermined electrical circuit of a device to be switched;
   the selectively enabling access to the one storage disabling access among or between the processor, memory and another of the plurality of identified storage, wherein only a single storage is accessed at a time, preventing a virus, a hacking executable code, an infection, or other harmful or malicious element from executing or from contaminating another storage;
   the computer further being of the type having a data port and means for mediating access of the computer over an external communications link with an external system; and the method further comprising:
   operating the computer in a connected state and in a disconnected state;
   the disconnected state being a state in which (i) the computer is prevented from communicating over the data port, and (ii) the data-store switch may enable access with any plurality of storage including permitting access with the first storage and the second storage;
   the connected state being a state in which (iii) the computer is permitted to communicate over the data port, and (iv) the data-store switch may not enable access with the first storage but may enable access with the second storage; and
   the permitting or preventing access to particular storage depending on whether the computer is communicating or not communicating with an external system via the data port and operable for isolating data received only to the second storage so that if the data received has a virus, a hacking executable code, an infection, or other harmful or malicious element it is confined to the second storage.

31. A method as in claim 30, further comprising executing a procedure to identify a virus, a hacking executable code, an infection, or other harmful or malicious element before permitting movement of the data received from the second storage to another storage.

32. A method as in claim 30, wherein the computer may operate in any of N states and the plurality of storage comprises at least N storage for association with the storage of N users data;
   assigning each of the N storage to a user or group of users, each storage having self-contained software for the user or group of users, including at least one of a bootable operating system, application program code and data, and user data files; and
   receiving a switch command and enabling the storage corresponding to a particular user or group of users so that a first user's data is separated from a second user's data on the same computer, the separating a users' data by enforcing security at a physical level rather than at the logical software-enforced level.

33. A method as in claim 32, wherein the computer comprises multiple mother boards each having a processor and a memory coupled to the processor, and a switch for switching the functioning components of a computer from one board to another, the method further comprising allocating different mother boards, processors, memories, and storage to different users or to different user processes.

34. A method as in claim 30, wherein received data is placed in a quarantined isolated storage for a period of time.

35. A method as in claim 34, wherein the quarantined isolated storage is selectively coupled with the processor and memory for a period of time but maintained in isolation from other of the plurality of storage.

36. A computer that self-repairs to maintain an operational status at any time during operation, the computer comprising:
   a main computer hardware box; at least one CPU disposed within the main computer hardware box;
   at least one random access memory disposed within the main computer hardware box and coupled to the at least one CPU;
   the at least one CPU and random access memory providing at least one user computing environment and a supporting computing environment substantially isolated from the user computing environment and operative to enhance the stability and functionality of the user computing environment by monitoring processes running or enabled within the user computing environment;
   first and second controllers for respective first and second data storage devices disposed within the main computer hardware box of the computer prior to a need for repair, the first data storage device storing programs and data for the user computing environment and the second data storage device being associated with the supporting computing environment and containing at least one backup snap-shot; and
   means for controlling the self-repair of the computer cooperatively coupled with said at least one CPU, said at least one random access memory, and said first and second controllers.

37. The computer of claim 36, wherein the repairing comprises:
   automatically repairing software on the first storage device according to preset preferences without further direction from the user, the preset preferences designating to repair the computer according to whether: to recover data, to run a virus check, to reformat the first storage device, to revert to a backup, or to run diagnostics.

38. The computer of claim 36, wherein the repairing comprises: reformatting the first storage device and then copying software onto the first storage device; or resetting parameters in a persistent memory and then copying software onto the first storage device.

39. The computer of claim 36, wherein the self-repair is initiated by a signal indicating a need for repair that is either:
   (i) self-generated by the computer without human intervention by the monitoring the processes running or enabled within the user computing environment; or
   (ii) generated by the computer in response to a single action by an external user, said single action selected from the set of actions consisting of: pressing a key or combination of keys on a keyboard of the computer and pressing or changing the state of a physical switch different from an on-off switch of the computer and exposed on an exterior surface of the main computer hardware box of the computer.

40. A computer as in claim 36, further comprising means for backing up programs and data on the computer and recovering the computer to a predetermined state in the event of a viral, hacker, or other malicious code contamination of the computer.

41. A computer as in claim 40, wherein the means for backing up includes means for obtaining at least one snap-shot of data on the computer.

42. A computer as in claim 36, wherein the self-repairing of the computer to a specified operational state is performed on-the-fly during normal operation without user intervention.

43. A computer as in claim 36, wherein the computer in operation automatically executes a plurality of individual computing processes selected from the set of computing processes consisting of monitoring the user computing environment, tracking the user computing environment, predicting the stability of the user computing environment, backing-up the user computing environment, restoring the user computing environment, and recovering attributes within the user computing environment.

44. A computer as in claim 43, wherein the attributes may be software specific, data specific, operating system specific, or any combination of the software, data, and operating system attributes.

45. A computer as in claim 43, wherein execution of the plurality of computing processes facilitates the normal operation of the user computing environment.

46. A computer as in claim 36, wherein the user computing environment is stabilized without user intervention that would perform a shut-down, restart, log off, log on, or termination of applications executing on the computer.

47. A computer as in claim 36, wherein the supporting environment is operative to interact with the user computing environment.

48. A computer as in claim 36, wherein the user computing environment and the supporting environment function in different computing systems physically residing in the main computer hardware box.

49. A computer as in claim 36, wherein the monitoring includes monitoring of the utilization of the user computing environment data storage device and data contained on the user computing environment data storage device.

50. A computer as in claim 49, wherein the monitoring of the user computing environment by the supporting computing environment identifies undesired changes and potential problems with the user computing environment.

51. A computer as in claim 50, wherein the supporting computing environment detects at least one of a freeze and an undesirable change within the user computing environment.

52. A computer as in claim 51, wherein when a freeze or other undesirable change is detected in the user environment, the supporting environment attempts to recover or restore or repair the user environment.

53. A computer as in claim 36, wherein the supporting computing environment is operative to re-enable the user environment, the enabling selected from the set consisting of: resetting a locked user environment keyboard, resetting connections, resetting and clearing devices, replacing defective software components, switch hardware components and/or devices, and combinations of these.

54. A computer as in claim 36, wherein the supporting computing environment obtains at least one snap-shot and subsequently copies all or part of the data from one or more of the at least one snapshots to recover or restore or repair the user environment.

55. A computer as in claim 36, wherein both the user computing environment and the supporting computing environment reside on a single computer system;
a snap-shot associated with the supporting computing environment of the operational user environment is obtained; processes associated with the supporting environment monitor the activities and status of the user computing environment;
a monitoring function is executed that detects any degraded performance of the user computing environment and notifies the supporting environment of any degraded performance detected; and
the supporting environment performing any recovery or repair action as necessary to recover or restore the user environment, the recovery optionally including utilizing the snap-shot to recover or restore the user environment.

56. A computer that has enhanced resistance or immunity to viral, Trojan-horse, hacker, or other malicious code infection, the computer comprising:
a processor;
a memory coupled to the processor;
a plurality of identified storage;
a switch selectively enabling or disabling access with any selected one or combination of the plurality of storage with said processor, said memory, or other ones of said plurality of storage; the selectively enabling or disabling access among or between the processor, memory and other of the plurality of identified storage preventing a virus, a hacking executable code, an infection, or other harmful or malicious element from executing or from contaminating another storage;
a data port and means for mediating access of the computer over an external communications link with an external system;
the computer being switchable to operable in a connected state and in a disconnected state;
the disconnected state being a state in which (i) the computer is prevented from communicating over the data port, and (ii) the data-store switch may enable access with any plurality of storage including permitting access with the first storage and the second storage;
the connected state being a state in which (iii) the computer is permitted to communicate over the data port, and (iv) the data-store switch may not enable access with the first storage but may enable access with the second storage;
the permitting or preventing access to particular storage depending on whether the computer is communicating or not communicating an external system via the data port isolating data received only to storage so that if the data received has a virus, a hacking executable code, an infection, or other harmful or malicious element it is confined to the second storage; and
the switching between the disconnected mode and the connected mode is initiated by an event, and the event includes a initiation of an internet browser program on the computer, the external system comprises an external network, and the communications link comprises a communications with the Internet network.

57. A computer as in claim 56, wherein upon receiving a request of the intent to connect with the internet or upon launch of the internet browser program the processor and computer programs executing within the processor programmatically initiates the connection of the data port to the communications link and the switching to enable/disable access of the first and second storage.

58. A computer that has enhanced resistance or immunity to viral, Trojan-horse, hacker, or other malicious code infection, the computer comprising:
   a processor;
   a memory coupled to the processor;
   a plurality of identified storage;
   a switch selectively enabling or disabling access with any selected one or combination of the plurality of storage with said processor, said memory, or other ones of said plurality of storage; the selectively enabling or disabling access among or between the processor, memory and other of the plurality of identified storage preventing a virus, a hacking executable code, an infection, or other harmful or malicious element from executing or from contaminating another storage;
   a data port and means for mediating access of the computer over an external communications link with an external system;
   the computer being operable in a connected state and in a disconnected state;
   the disconnected state being a state in which (i) the computer is prevented from communicating over the data port, and (ii) the data-store switch may enable access with any plurality of storage including permitting access with the first storage and the second storage;
   the connected state being a state in which (iii) the computer is permitted to communicate over the data port, and (iv) the data-store switch may not enable access with the first storage but may enable access with the second storage; and
   the permitting or preventing access to particular storage depending on whether the computer is communicating or not communicating an external system via the data port isolating data received only to storage so that if the data received has a virus, a hacking executable code, an infection, or other harmful or malicious element it is confined to the second storage; and
   wherein a browser on the second storage may launch automatically on the boot from the second storage.

59. A computer that has enhanced resistance or immunity to viral, Trojan-horse, hacker, or other malicious code infection, the computer comprising:
   a processor;
   a memory coupled to the processor;
   a plurality of identified storage; and
   a switch selectively enabling or disabling access with any selected one or combination of the plurality of storage with said processor, said memory, or other ones of said plurality of storage; the selectively enabling or disabling access among or between the processor, memory and other of the plurality of identified storage preventing a virus, a hacking executable code, an infection, or other harmful or malicious element from executing or from contaminating another storage;
   a data port and means for mediating access of the computer over an external communications link with an external system;
   and the computer being operable in a connected state and in a disconnected state:
   the disconnected state being a state in which (i)the computer is prevented from communicating over the data port, and (ii) the data-store switch may enable access with any plurality of storage including permitting access with the first storage and the second storage;
   the connected state being a state in which (iii) the computer is permitted to communicate over the data port, and (iv) the data-store switch may not enable access with the first storage but may enable access with the second storage;
   the permitting or preventing access to particular storage depending on whether the computer is communicating or not communicating an external system via the data port isolating data received only to storage so that if the data received has a virus, a hacking executable code, an infection, or other harmful or malicious element it is confined to the second storage; and
   the second storage does not contain application software to process the data received over the communications link and there is a need to migrate the data on the second storage to the first storage For processing or migrate the application program on first storage to the second storage for processing the data on first storage.

60. A computer that has enhanced resistance or immunity to viral, Trojan-horse, hacker, or other malicious code infection, the computer comprising:
   a processor:
   a memory coupled to the processor;
   a plurality of identified storage; and
   a switch selectively enabling or disabling access with any selected one or combination of the plurality oF storage with said processor, said memory, or other ones of said plurality of storage; the selectively enabling or disabling access among or between the processor, memory and other of the plurality of identified storage preventing a virus, a hacking executable code, an infection, or other harmful or malicious element from executing or from contaminating another storage;
   a data pod and means for mediating access of the computer over an external communications link with an external system;
   and the computer being operable in a connected state and in a disconnected state;
   the disconnected state being a state in which (i) the computer is prevented from communicating over the data port, and (ii) the data-store switch may enable access with any plurality of storage including permitting access with the first storage and the second storage;
   the connected state being a state in which (iii) the computer is permitted to communicate over the data port, and (iv) the data-store switch may not enable access with the first storage but may enable access with the second storage;
   the permitting or preventing access to particular storage depending on whether the computer is communicating or not communicating an external system via the data port isolating data received only to storage so that if the data received has a virus, a hacking executable code, an infection, or other harmful or malicious element it is confined to the second storage; and
   the computer simultaneously enables the first and second storage and copies the data received over the communications link to first storage for processing on the first storage.

61. A computer that has enhanced resistance or immunity to viral, Trojan-horse, hacker, or other malicious code infection, the computer comprising:
   a processor;
   a memory coupled to the processor;
   a plurality of identified storage; and
   a switch selectively enabling or disabling access with any selected one or combination of the plurality of storage with said processor, said memory, or other ones of said plurality of storage; the selectively enabling or disabling access among or between the processor, memory and other of the plurality of identified storage preventing a virus, a hacking executable code, an infection, or other harmful or malicious element from executing or from contaminating another storage;

a data port and means for mediating access or the computer over an external communications link with an external system;

and the computer being operable in a connected state and in a disconnected state;

the disconnected state being a state in which (i) the computer is prevented from communicating over the data port, and (ii) the data-store switch may enable access with any plurality of storage including permitting access with the first storage and the second storage;

the connected state being a state in which (iii) the computer is permitted to communicate over the data port, and (iv) the data-store switch may not enable access with the first storage but may enable access with the second storage;

the permitting or preventing access to particular storage depending on whether the computer is communicating or not communicating an external system via the data port isolating data received only to storage so that if the data received has a virus, a hacking executable code, an infection, or other harmful or malicious element it is confined to the second storage; and the computer simultaneously enables the first and second storage and copies the applications program to the second storage for processing of the data on the second storage.

* * * * *